US007764191B2

(12) United States Patent
Hall et al.

(10) Patent No.: US 7,764,191 B2
(45) Date of Patent: Jul. 27, 2010

(54) RFID TAG DATA AFFECTING AUTOMATION CONTROLLER WITH INTERNAL DATABASE

(75) Inventors: Kenwood H. Hall, Hudson, OH (US); Vivek R. Bapat, Pittsburgh, PA (US); Sujeet Chand, Brookfield, WI (US); Richard A. Morse, Hudson, OH (US); Joseph P. Owen, Jr., Elm Grove, WI (US); Arthur P. Pietrzyk, Thompson, OH (US); Andreas Somogyi, Sagamore Hills, OH (US); Kenneth A. Tinnell, Loveland, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 742 days.

(21) Appl. No.: 11/190,143

(22) Filed: Jul. 26, 2005

(65) Prior Publication Data

US 2007/0024463 A1    Feb. 1, 2007

(51) Int. Cl.
G08C 19/00    (2006.01)
(52) U.S. Cl. .............................. 340/825.69; 340/572.1; 700/215; 700/95; 700/212
(58) Field of Classification Search ............ 340/825.69, 340/10.1–10.6; 364/468.22; 709/204; 700/115–117, 700/224–226, 95–212; 370/310, 310.1, 310.2
See application file for complete search history.

(56) References Cited

U.S. PATENT DOCUMENTS

| 3,858,212 A | 12/1974 | Tompkins et al. |
|---|---|---|
| 4,949,299 A | 8/1990 | Pickett et al. |
| 5,300,875 A | 4/1994 | Tuttle |
| 5,461,666 A | 10/1995 | McMahan et al. |
| 5,613,228 A | 3/1997 | Tuttle et al. |
| 5,621,199 A | 4/1997 | Calari et al. |
| 5,629,981 A | 5/1997 | Nerlikar |
| 5,689,415 A | 11/1997 | Calotychos et al. |
| 5,701,127 A | 12/1997 | Sharpe |

(Continued)

FOREIGN PATENT DOCUMENTS

CN    1426546 A    6/2003

(Continued)

OTHER PUBLICATIONS

Partial International Search Report dated Mar. 30, 2006, for PCT Application Serial No. PCT/EP2005/007878, 3 pages.

(Continued)

*Primary Examiner*—Brian A Zimmerman
*Assistant Examiner*—Yong Hang Jiang
(74) *Attorney, Agent, or Firm*—Turocy & Watson LLP; R. Scott Speroff; John M. Miller

(57) ABSTRACT

The claimed subject matter provides a system and/or a method that facilitates utilizing a radio frequency identification (RFID) tag associated with an object. An RFID component can receive extended data from the RFID tag that identifies an operation. An automation device can then manipulate the object based at least in part upon the extended data and the identified operation. Moreover, a controller can be utilized to control the automation device, wherein the controller utilizes an internal database and/or data store to provide efficient access to specific information.

28 Claims, 13 Drawing Sheets

U.S. PATENT DOCUMENTS

| | | | |
|---|---|---|---|
| 5,703,347 | A | 12/1997 | Reddersen et al. |
| 5,785,181 | A | 7/1998 | Quartararo, Jr. |
| 5,798,693 | A * | 8/1998 | Engellenner ............. 340/10.33 |
| 5,822,714 | A | 10/1998 | Cato |
| 5,874,724 | A | 2/1999 | Cato |
| 5,874,896 | A | 2/1999 | Lowe et al. |
| 5,905,249 | A | 5/1999 | Reddersen et al. |
| 5,910,776 | A | 6/1999 | Black |
| 5,952,935 | A | 9/1999 | Mejia et al. |
| 5,963,134 | A | 10/1999 | Bowers et al. |
| 5,964,656 | A | 10/1999 | Lawler, Jr. et al. |
| 5,971,587 | A * | 10/1999 | Kato et al. .................. 700/115 |
| 5,973,600 | A | 10/1999 | Mosher, Jr. |
| 5,983,200 | A | 11/1999 | Slotznick |
| 5,992,096 | A | 11/1999 | De La Cerda et al. |
| 6,049,745 | A | 4/2000 | Douglas et al. |
| 6,091,998 | A | 7/2000 | Vasko et al. |
| 6,115,616 | A | 9/2000 | Halperin et al. |
| 6,116,505 | A | 9/2000 | Withrow |
| 6,121,878 | A | 9/2000 | Brady et al. |
| 6,144,301 | A | 11/2000 | Frieden |
| 6,150,948 | A | 11/2000 | Watkins |
| 6,154,790 | A | 11/2000 | Pruett et al. |
| 6,169,483 | B1 | 1/2001 | Ghaffari et al. |
| 6,170,059 | B1 | 1/2001 | Pruett et al. |
| 6,172,609 | B1 | 1/2001 | Lu et al. |
| 6,205,362 | B1 | 3/2001 | Eidson |
| 6,211,789 | B1 | 4/2001 | Oldham et al. |
| 6,263,440 | B1 | 7/2001 | Pruett et al. |
| 6,264,106 | B1 | 7/2001 | Bridgelall |
| 6,265,976 | B1 | 7/2001 | Roesner et al. |
| 6,272,321 | B1 | 8/2001 | Bruhnke et al. |
| 6,275,681 | B1 | 8/2001 | Vega et al. |
| 6,282,407 | B1 | 8/2001 | Vega et al. |
| 6,282,455 | B1 | 8/2001 | Engdahl |
| 6,285,295 | B1 | 9/2001 | Cusden |
| 6,286,762 | B1 | 9/2001 | Reynolds et al. |
| 6,286,763 | B1 | 9/2001 | Reynolds et al. |
| 6,293,467 | B1 | 9/2001 | Reddersen et al. |
| 6,297,734 | B1 | 10/2001 | Richardson et al. |
| 6,305,548 | B1 | 10/2001 | Sato et al. |
| 6,307,517 | B1 | 10/2001 | Lee |
| 6,317,027 | B1 | 11/2001 | Watkins |
| 6,318,636 | B1 | 11/2001 | Reynolds et al. |
| 6,330,971 | B1 | 12/2001 | Mabry et al. |
| 6,342,839 | B1 | 1/2002 | Curkendall et al. |
| 6,354,493 | B1 | 3/2002 | Mon |
| 6,362,738 | B1 | 3/2002 | Vega |
| 6,366,206 | B1 | 4/2002 | Ishikawa et al. |
| 6,377,176 | B1 | 4/2002 | Lee |
| 6,377,203 | B1 | 4/2002 | Doany |
| 6,377,764 | B1 | 4/2002 | Morris-Jones |
| 6,392,544 | B1 | 5/2002 | Collins et al. |
| 6,400,272 | B1 | 6/2002 | Holtzman |
| 6,400,372 | B1 | 6/2002 | Gossweiler, III et al. |
| 6,401,936 | B1 | 6/2002 | Isaacs |
| 6,409,401 | B1 | 6/2002 | Petteruti et al. |
| 6,415,978 | B1 | 7/2002 | McAllister |
| 6,429,776 | B1 | 8/2002 | Alicot et al. |
| 6,445,297 | B1 | 9/2002 | Nicholson |
| 6,445,969 | B1 | 9/2002 | Kenney |
| 6,448,886 | B2 | 9/2002 | Garber et al. |
| 6,451,154 | B1 | 9/2002 | Grabau |
| 6,476,708 | B1 | 11/2002 | Johnson |
| 6,480,100 | B1 | 11/2002 | Frieden et al. |
| 6,484,886 | B1 | 11/2002 | Isaacs |
| 6,486,780 | B1 | 11/2002 | Garber |
| 6,501,382 | B1 | 12/2002 | Rehfus |
| 6,505,780 | B1 | 1/2003 | Yassin et al. |
| 6,517,000 | B1 | 2/2003 | McAllister et al. |
| 6,523,752 | B2 | 2/2003 | Nishitani et al. |
| 6,529,880 | B1 | 3/2003 | McKeen et al. |
| 6,547,040 | B2 | 4/2003 | Goodwin, III |
| 6,549,064 | B2 * | 4/2003 | Bandy et al. ................. 327/536 |
| 6,554,187 | B2 | 4/2003 | Otto |
| 6,563,425 | B2 | 5/2003 | Nicholson et al. |
| 6,566,997 | B1 | 5/2003 | Bradin |
| 6,585,165 | B1 | 7/2003 | Kuroda et al. |
| 6,587,856 | B1 * | 7/2003 | Srinivasan et al. .......... 707/102 |
| 6,593,853 | B1 | 7/2003 | Barrett et al. |
| 6,600,418 | B2 | 7/2003 | Francis et al. |
| 6,607,123 | B1 | 8/2003 | Jollifee et al. |
| 6,608,551 | B1 | 8/2003 | Anderson et al. |
| 6,608,561 | B2 | 8/2003 | Lawler, Jr. et al. |
| 6,612,495 | B2 | 9/2003 | Reddersen et al. |
| 6,617,962 | B1 | 9/2003 | Horwitz et al. |
| 6,621,417 | B2 | 9/2003 | Duncan et al. |
| 6,622,567 | B1 | 9/2003 | Hamel et al. |
| 6,641,042 | B1 | 11/2003 | Pierenkemper et al. |
| 6,650,227 | B1 | 11/2003 | Bradin |
| 6,664,897 | B2 | 12/2003 | Pape et al. |
| 6,669,089 | B2 | 12/2003 | Cybulski et al. |
| 6,672,512 | B2 | 1/2004 | Bridgelall |
| 6,677,852 | B1 | 1/2004 | Landt |
| 6,687,293 | B1 | 2/2004 | Loyer et al. |
| 6,693,539 | B2 | 2/2004 | Bowers et al. |
| 6,700,533 | B1 | 3/2004 | Werb et al. |
| 6,700,931 | B1 | 3/2004 | Lee et al. |
| 6,707,376 | B1 | 3/2004 | Patterson et al. |
| 6,712,276 | B1 | 3/2004 | Abali et al. |
| 6,714,121 | B1 | 3/2004 | Moore |
| 6,724,308 | B2 | 4/2004 | Nicholson |
| 6,726,099 | B2 | 4/2004 | Becker et al. |
| 6,745,008 | B1 | 6/2004 | Carrender et al. |
| 6,747,560 | B2 | 6/2004 | Stevens, III |
| 6,750,769 | B1 | 6/2004 | Smith |
| 6,752,277 | B1 | 6/2004 | Sempliner |
| 6,784,789 | B2 | 8/2004 | Eroglu et al. |
| 6,784,813 | B2 | 8/2004 | Shanka et al. |
| 6,791,603 | B2 | 9/2004 | Lazo et al. |
| 6,793,127 | B2 | 9/2004 | Alsafadi et al. |
| 6,802,659 | B2 | 10/2004 | Cremon et al. |
| 6,808,116 | B1 | 10/2004 | Eslambolchi |
| 6,809,646 | B1 | 10/2004 | Lee |
| 6,812,824 | B1 | 11/2004 | Goldinger et al. |
| 6,812,838 | B1 | 11/2004 | Maloney |
| 6,816,817 | B1 | 11/2004 | Retlich |
| 6,828,902 | B2 | 12/2004 | Casden |
| 6,842,106 | B2 | 1/2005 | Hughes et al. |
| 6,847,856 | B1 | 1/2005 | Bohannon |
| 6,853,294 | B1 | 2/2005 | Ramamurthy et al. |
| 6,853,303 | B2 | 2/2005 | Chen et al. |
| 6,870,797 | B2 | 3/2005 | Reasoner et al. |
| 6,873,260 | B2 | 3/2005 | Lancos et al. |
| 6,878,896 | B2 | 4/2005 | Braginsky et al. |
| 6,879,809 | B1 | 4/2005 | Vega et al. |
| 6,888,459 | B2 | 5/2005 | Stilp |
| 6,897,763 | B2 | 5/2005 | Schulmerich et al. |
| 6,899,476 | B1 | 5/2005 | Barrus et al. |
| 6,901,304 | B2 | 5/2005 | Swan et al. |
| 6,903,656 | B1 | 6/2005 | Lee |
| 6,917,291 | B2 | 7/2005 | Allen |
| 6,918,541 | B2 | 7/2005 | Knowles et al. |
| 6,929,412 | B1 | 8/2005 | Barrus et al. |
| 6,935,560 | B2 | 8/2005 | Andreasson et al. |
| 6,940,408 | B2 | 9/2005 | Ferguson et al. |
| 6,943,678 | B2 | 9/2005 | Muirhead |
| 6,943,688 | B2 | 9/2005 | Chung et al. |
| 6,967,579 | B1 | 11/2005 | Elizondo |
| 6,975,229 | B2 | 12/2005 | Carrender et al. |
| 6,999,955 | B1 * | 2/2006 | Horvitz ....................... 706/45 |
| 7,023,342 | B2 | 4/2006 | Corbett et al. |
| 7,036,729 | B2 | 5/2006 | Chung |
| 7,057,509 | B2 | 6/2006 | Gualdi et al. |

| | | | | | | |
|---|---|---|---|---|---|---|
| 7,061,379 | B2 | 6/2006 | Chen et al. | 2005/0040934 A1 | 2/2005 | Shanton |
| 7,066,388 | B2 | 6/2006 | He | 2005/0052283 A1 | 3/2005 | Collins et al. |
| 7,066,667 | B2 | 6/2006 | Chapman et al. | 2005/0058483 A1 | 3/2005 | Chapman et al. |
| 7,069,100 | B2 * | 6/2006 | Monette et al. ............ 700/116 | 2005/0062603 A1 | 3/2005 | Fuerst et al. |
| 7,073,712 | B2 | 7/2006 | Jusas et al. | 2005/0068179 A1 | 3/2005 | Roesner |
| 7,075,412 | B1 | 7/2006 | Reynolds et al. | 2005/0083180 A1 | 4/2005 | Horwicz et al. |
| 7,079,023 | B2 | 7/2006 | Haller | 2005/0088299 A1 | 4/2005 | Bandy et al. |
| 7,084,769 | B2 | 8/2006 | Bauer et al. | 2005/0092825 A1 | 5/2005 | Cox et al. |
| 7,114,655 | B2 | 10/2006 | Chapman et al. | 2005/0093678 A1 | 5/2005 | Forster et al. |
| 7,127,507 | B1 | 10/2006 | Clark et al. | 2005/0093703 A1 | 5/2005 | Twitchell |
| 7,135,976 | B2 | 11/2006 | Neff et al. | 2005/0099268 A1 | 5/2005 | Juels et al. |
| 7,151,456 | B2 | 12/2006 | Godfrey | 2005/0110641 A1 | 5/2005 | Mendolia et al. |
| 7,165,722 | B2 | 1/2007 | Shafer et al. | 2005/0135181 A1 | 6/2005 | Shionoiri et al. |
| 7,183,922 | B2 | 2/2007 | Mendolia et al. | 2005/0140511 A1 | 6/2005 | Bonnell et al. |
| 7,187,288 | B2 | 3/2007 | Mendolia et al. | 2005/0143026 A1 | 6/2005 | Bellantoni |
| 7,194,072 | B2 | 3/2007 | Gamble | 2005/0143916 A1 | 6/2005 | Kim et al. |
| 7,195,159 | B2 | 3/2007 | Sloan et al. | 2005/0145688 A1 | 7/2005 | Milenkovic et al. |
| 7,221,258 | B2 | 5/2007 | Lane et al. | 2005/0149414 A1 | 7/2005 | Schrodt et al. |
| 7,240,027 | B2 | 7/2007 | McConnell et al. | 2005/0154572 A1 | 7/2005 | Sweeney |
| 7,272,502 | B2 | 9/2007 | Lee et al. | 2005/0155213 A1 | 7/2005 | Eastin |
| 7,336,153 | B2 | 2/2008 | Malone et al. | 2005/0159913 A1 | 7/2005 | Ariyoshi et al. |
| 7,336,167 | B2 | 2/2008 | Olsen, III et al. | 2005/0162256 A1 | 7/2005 | Kinoshita |
| 7,336,243 | B2 * | 2/2008 | Jo et al. ...................... 343/895 | 2005/0170784 A1 | 8/2005 | Ariyoshi et al. |
| 7,339,476 | B2 | 3/2008 | Macurek et al. | 2005/0177423 A1 | 8/2005 | Swanson |
| 7,373,087 | B2 | 5/2008 | Shi et al. | 2005/0177466 A1 | 8/2005 | Willins |
| 7,388,491 | B2 | 6/2008 | Chand et al. | 2005/0179521 A1 | 8/2005 | Pillai et al. |
| 7,389,921 | B2 | 6/2008 | Lin et al. | 2005/0180566 A1 | 8/2005 | Ryal |
| 7,486,181 | B2 | 2/2009 | Olsen et al. | 2005/0188095 A1 | 8/2005 | Gardiner et al. |
| 7,510,110 | B2 | 3/2009 | Pietrzyk et al. | 2005/0190098 A1 | 9/2005 | Bridgelall et al. |
| 7,520,429 | B2 * | 4/2009 | Koster ........................ 235/383 | 2005/0192727 A1 | 9/2005 | Shostak et al. |
| 2001/0000019 | A1 | 3/2001 | Bowers et al. | 2005/0197775 A1 | 9/2005 | Smith |
| 2001/0008390 | A1 | 7/2001 | Berquist | 2005/0200457 A1 | 9/2005 | Bridgelall et al. |
| 2001/0015760 | A1 | 8/2001 | Fellegara et al. | 2005/0206552 A1 | 9/2005 | Friedrich |
| 2002/0005774 | A1 | 1/2002 | Rudolph | 2005/0206555 A1 | 9/2005 | Bridgelall et al. |
| 2002/0067265 | A1 | 6/2002 | Rudolph | 2005/0212660 A1 | 9/2005 | Hansen et al. |
| 2002/0070862 | A1 | 6/2002 | Francis et al. | 2005/0212673 A1 | 9/2005 | Forster |
| 2002/0130778 | A1 | 9/2002 | Nicholson | 2005/0212676 A1 | 9/2005 | Steinberg |
| 2002/0143320 | A1 | 10/2002 | Levin | 2005/0219039 A1 | 10/2005 | Allen |
| 2002/0155843 | A1 | 10/2002 | Bahl et al. | 2005/0228528 A1 | 10/2005 | Farchmin et al. |
| 2002/0165758 | A1 | 11/2002 | Hind et al. | 2005/0237162 A1 | 10/2005 | Hyde et al. |
| 2002/0167397 | A1 | 11/2002 | Eroglu et al. | 2005/0240305 A1 | 10/2005 | Bogash et al. |
| 2002/0185532 | A1 | 12/2002 | Berquist et al. | 2005/0241548 A1 | 11/2005 | Muirhead |
| 2003/0007473 | A1 | 1/2003 | Strong et al. | 2005/0253717 A1 | 11/2005 | Howarth et al. |
| 2003/0023337 | A1 | 1/2003 | Godfrey et al. | 2005/0258955 A1 | 11/2005 | Gloekler et al. |
| 2003/0071731 | A1 | 4/2003 | Jesme | 2005/0269407 A1 | 12/2005 | Harmon |
| 2003/0102367 | A1 | 6/2003 | Monette et al. | 2006/0006231 A1 | 1/2006 | Anson et al. |
| 2003/0109951 | A1 * | 6/2003 | Hsiung et al. ................ 700/108 | 2006/0027658 A1 | 2/2006 | Genc et al. |
| 2003/0126103 | A1 | 7/2003 | Chen et al. | 2006/0038077 A1 | 2/2006 | Olin et al. |
| 2003/0150908 | A1 | 8/2003 | Pokorny et al. | 2006/0049250 A1 | 3/2006 | Sullivan |
| 2003/0169149 | A1 | 9/2003 | Ohki et al. | 2006/0053234 A1 | 3/2006 | Kumar et al. |
| 2003/0203730 | A1 | 10/2003 | Wan et al. | 2006/0055508 A1 | 3/2006 | Kumar et al. |
| 2003/0210142 | A1 | 11/2003 | Freathy et al. | 2006/0060657 A1 | 3/2006 | Choong et al. |
| 2003/0216969 | A1 | 11/2003 | Bauer et al. | 2006/0071774 A1 | 4/2006 | Brown et al. |
| 2003/0225635 | A1 | 12/2003 | Renz et al. | 2006/0108411 A1 | 5/2006 | Macurek et al. |
| 2004/0008123 | A1 | 1/2004 | Carrender et al. | 2006/0125653 A1 | 6/2006 | McQuade |
| 2004/0024644 | A1 | 2/2004 | Gui et al. | 2006/0125694 A1 | 6/2006 | Dejanovic et al. |
| 2004/0032443 | A1 | 2/2004 | Moylan | 2006/0145850 A1 | 7/2006 | Krstulich |
| 2004/0046642 | A1 * | 3/2004 | Becker et al. ............ 340/10.32 | 2006/0170565 A1 | 8/2006 | Husak et al. |
| 2004/0061324 | A1 | 4/2004 | Howard | 2006/0200256 A1 | 9/2006 | Mason et al. |
| 2004/0062294 | A1 | 4/2004 | Clemens et al. | 2006/0208859 A1 | 9/2006 | Hougen et al. |
| 2004/0066281 | A1 | 4/2004 | Hughes et al. | 2006/0232382 A1 | 10/2006 | Bauer et al. |
| 2004/0069851 | A1 | 4/2004 | Grunes | 2006/0250248 A1 | 11/2006 | Tu et al. |
| 2004/0084526 | A1 | 5/2004 | Knowles et al. | 2006/0279412 A1 | 12/2006 | Holland et al. |
| 2004/0095910 | A1 | 5/2004 | Metts et al. | 2007/0008073 A1 | 1/2007 | Poasevara |
| 2004/0108378 | A1 | 6/2004 | Gatz | 2007/0013517 A1 | 1/2007 | Posamentier |
| 2004/0124988 | A1 | 7/2004 | Leonard et al. | 2007/0013519 A1 | 1/2007 | Chung et al. |
| 2004/0160324 | A1 | 8/2004 | Stilp | 2007/0035396 A1 | 2/2007 | Chand et al. |
| 2004/0181467 | A1 | 9/2004 | Raiyani et al. | 2007/0040681 A1 | 2/2007 | Jessup |
| 2004/0189443 | A1 | 9/2004 | Eastburn | 2007/0063029 A1 | 3/2007 | Brandt et al. |
| 2004/0220860 | A1 | 11/2004 | Persky et al. | 2007/0137531 A1 | 6/2007 | Muirhead |
| 2005/0012613 | A1 | 1/2005 | Eckstein et al. | 2007/0159311 A1 | 7/2007 | Schober |
| 2005/0021369 | A1 | 1/2005 | Cohen | 2007/0159331 A1 | 7/2007 | Zegelin |
| 2005/0035849 | A1 | 2/2005 | Yizhack | 2007/0205860 A1 | 9/2007 | Jones et al. |

2007/0205861 A1    9/2007    Nair et al.

FOREIGN PATENT DOCUMENTS

| DE | 10314260 A1 | 10/2004 |
|---|---|---|
| EP | 1542105 A | 6/2005 |
| WO | 0016289 | 3/2000 |
| WO | 0058752 | 10/2000 |
| WO | 0169516 | 9/2001 |
| WO | 01/82009 A2 | 11/2001 |
| WO | 02073523 | 9/2002 |
| WO | 02/101670 A2 | 12/2002 |
| WO | 03056403 A | 7/2003 |
| WO | 03056469 A | 7/2003 |
| WO | 2005045743 A | 5/2005 |
| WO | 2007/030544 A3 | 3/2007 |

OTHER PUBLICATIONS

International Search Report dated May 17, 2006 for International Patent Application Serial No. PCT/EP2005/007878, 8 pages.
European Search Report dated Feb. 6, 2006 mailed Feb. 20, 2006 for European Patent Application Serial No. 10/985,173, 3 Pages.
M. Karkkainen, et al.: "The product centric approach: a solution to supply network information management problems?" Computers in Industry, Elsevier Science Publishers. Amsterdam, NL, vol. 52, No. 2, Oct. 2003.
European Search Report dated Feb. 14, 2006 mailed Feb. 20, 2006 for European Patent Application Serial No. 10/985,621, 3 Pages.
International Search Report for PCT Application No. PCT/US06/34290, mailed Feb. 5, 2008, 2 pages.
OA Dated Aug. 8, 2008 for U.S. Appl. No. 11/241,421, 49 pages.
OA Dated Aug. 28, 2008 for U.S. Appl. No. 11/129,199, 28 pages.
OA Dated May 30, 2008 for U.S. Appl. No. 11/222,256, 60 pages.
OA Dated Apr. 28, 2008 for U.S. Appl. No. 11/220,130, 29 pages.
OA Dated Apr. 30, 2008 for U.S. Appl. No. 11/185,114, 80 pages.
International Search Report for PCT Application Serial No. PCT/US06/34290, mailed Feb. 5, 2008, 2 pages.
OA Dated Jan. 30, 2009 for U.S. Appl. No. 11/129,199, 32 pages.
OA Dated Nov. 28, 2008 for U.S. Appl. No. 11/239,959, 75 pages.
OA Dated Jan. 12, 2009 for U.S. Appl. No. 11/184,233, 359 pages.
OA Dated Mar. 19, 2009 for U.S. Appl. No. 11/220,130, 18 pages.
OA Dated Nov. 24, 2008 for U.S. Appl. No. 11/220,130, 36 pages.
OA Dated Mar. 26, 2009 for U.S. Appl. No. 11/200,915, 70 pages.
OA Dated Sep. 30, 2008 for U.S. Appl. No. 11/230,758, 63 pages.
OA Dated Feb. 6, 2009 for U.S. Appl. No. 11/241,421, 14 pages.
OA Dated Oct. 2, 2008 for U.S. Appl. No. 11/185,114, 42 pages.
International Search Report for PCT Application Serial No. PCT/US06/34721 mailed Apr. 26, 2007, 1 page.
OA Dated Apr. 16, 2009 for U.S. Appl. No. 11/230,758, 26 pages.
CN OA Dispatched Jul. 4, 2008 for Chinese Application No. 200610141407.1, 12 pages.
EPOA dated Mar. 19, 2009 for European Patent Application No. 05 776 159.5, 3 pages.
EPOA dated Aug. 20, 2008 for European Patent Application No. 05 776 159.5, 3 pages.
International Search Report dated May 17, 2006 for PCT Application No. PCT/EP2005/007878, 8 pages.
OA dated Jun. 4, 2009 for U.S. Appl. No. 11/185,114, 95 pages.
OA dated May 14, 2009 for U.S. Appl. No. 11/239,959, 37 pages.
CNOA due Apr. 1, 2008 for Chinese Patent Application No. 200510137387.6, 21 pages.
OA dated Jan. 7, 2010 for U.S. Appl. No. 12/040,305, 78 pages.
European Search Report dated Nov. 20, 2009 for European Patent Application No. EP 06 80 3042, 7 pages.
OA dated Dec. 24, 2009 for U.S. Appl. No. 12/140,118, 76 pages.
OA dated Jan. 27, 2010 for U.S. Appl. No. 11/185,114, 88 pages.
OA dated Jan. 13, 2010 for U.S. Appl. No. 12/263,750, 16 pages.
OA dated Mar. 1, 2010 for U.S. Appl. No. 11/239,959, 29 pages.
OA dated Aug. 21, 2009 for U.S. Appl. No. 11/239,959, 34 pages.
OA Dated Jul. 28, 2009 for U.S. Appl. No. 11/220,130, 32 pages.
OA dated Jul. 30, 2009 for U.S. Appl. No. 12/263,750, 65 pages.
OA Dated Aug. 26, 2009 for U.S. Appl. No. 11/241,421, 24 pages.
OA dated Oct. 8, 2009 for U.S. Appl. No. 11/200,915, 41 pages.
OA dated Oct. 27, 2009 for U.S. Appl. No. 11/230,758, 39 pages.

* cited by examiner

RFID TAG DATA AFFECTING AUTOMATION CONTROLLER WITH INTERNAL DATABASE

TECHNICAL FIELD

The claimed subject matter is related to RFID technology, and more specifically to RFID tags utilized within an industrial automation system.

BACKGROUND

An evolving technology that is rapidly gaining interest is Radio Frequency Identification (RFID), which leverages electronic data to mitigate data reading (e.g., scanning bar codes) and/or opening containers to obtain product information. RFID technology leverages electronic data and wireless communications for identification purposes. With RFID systems, electronic data typically is stored within an RFID tag, which can be formed from a small silicon chip and one or more antennas and affixed to a product. Reading from and/or writing to an RFID tag can be achieved through radio frequency (RF) based wireless communication via devices referred to as RFID readers. An RFID reader is a device that can be utilized to read and/or write RFID tag data, depending on read/write privileges.

In general, writing is utilized to add and/or modify product-specific information to an RFID tag, and reading is utilized to retrieve the information, for example, to provide for automatic product identification. In many instances, the electronic data written to and/or read from an RFID tag includes an Electronic Product Code (EPC), as well as other product-related data. The EPC, in general, is a unique number that is encoded (e.g., as a bit code) and embedded within the RFID tag (a small silicon chip with one or more antennas) affixed to an associated product. Typical EPC data can include information about the associated product (e.g., product type, date of manufacture, lot number, source data, destination data, unique product code, . . . ) and/or associated pallets, boxes, cases and/or container levels, for example.

In today's highly sophisticated, complex and intelligent industrial automation systems, RFID technology is becoming an increasingly important presence for logistics concerns, material handling and inventory management. Simply knowing that an object exists in a large warehouse is no longer sufficient. When implementing an RFID solution in a distribution center or a factory, it is customary to utilize three distinct platforms: an RFID reader/antenna (e.g., a fixed implementation), RFID "middleware" software running on a standard PC (Personal Computer), and an industrial controller (e.g., a PLC—Programmable Logic Controller). A traditional communications approach is to have the RFID reader connect to the controller via a network using, for example, RS-232 serial communications, Ethernet, or any of the field buses such as DeviceNet, ControlNet, etc. Thus, data read from the RFID tag can be utilized to provide a greater degree of certainty over what goes into a supply chain and how to manage raw materials, warehouse inventory, shipments, logistics, and/or various other aspects of manufacturing.

When passed through or scanned by a reader, an RFID tag emits stored electronic data such that the data can be retrieved by an RFID reader without unpacking the product or scanning barcode labels. Read information can be utilized to provide a greater degree of certainty over what goes into a supply chain and/or how to manage raw materials, warehouse inventory, shipments, logistics, and/or various other aspects of manufacturing. Yet, there is a need to provide techniques and/or methods in allowing the intelligent industrial automation systems leverage off such RFID technology.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate utilizing radio frequency identification (RFID) tag data with an automation device. An RFID component can transfer data from an RFID tag via wireless communication, wherein the RFID tag can include data that can be utilized by an automation device. The RFID tag data can include extended data and/or user defined data, wherein such data can define an operation and/or mechanism implemented by the automation device. The automation device can utilize the bits and/or numbers within the RFID tag data to directly or indirectly effect control output. For instance, the extended information can be routing information for an object associated with an RFID tag, wherein the object moves through transfer gates based at least in part upon the extended information. In another example, the extended information can be detailed process parameters for driving process automation control at a plurality of stations in a manufacturing application.

In accordance with one aspect of the claimed subject matter, the automation device can be controlled by a controller. The controller can include software and/or hardware components having inputs and/or outputs that can be programmed to deliver/receive automation manufacturing-related data. Moreover, the controller can include an internal database and/or data store that provide storage of data to invoke efficient access to RFID related information. For instance, the internal database and/or data store can store information such as, but not limited to, object history, a desired operation, a desired mechanism, location information, an intended customer, an authorized operator, etc. In accordance with another aspect of the claimed subject matter, the controller can receive external communications from a business system, wherein the business system can utilize the RFID tag data within the internal database.

In accordance with another aspect of the innovation described herein, the RFID tag data can be related to a plurality of operations, a portion of the plurality of operations, and a single operation that is controlled by at least one automation device. Furthermore, the extended data and/or user defined data included with the RFID tag can be re-written based at least part upon a completion and/or a portion of completion of a particular operation. The re-written extended data and/or user defined data can relate to a disparate operation and/or mechanism and/or a disparate automation device, and/or any combination thereof.

In accordance with another aspect of the claimed subject matter, the RFID tag can be a passive tag that utilizes ultra high frequency (UHF), wherein a power source is not included on the RFID tag. Moreover, the RFID tag data can include at least one of extended data, user defined data, tag identification, product data, reader identification, environment data, etc. The RFID tag can then be associated with an object and/or item, to which a particular operation and/or mechanism is to be invoked by the automation device. For example, the RFID tag can be associated with a pallet, a box, the object itself, etc. In other aspects of the claimed subject matter, methods are provided that facilitate utilizing radio frequency identification (RFID) tag data with an automation device.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
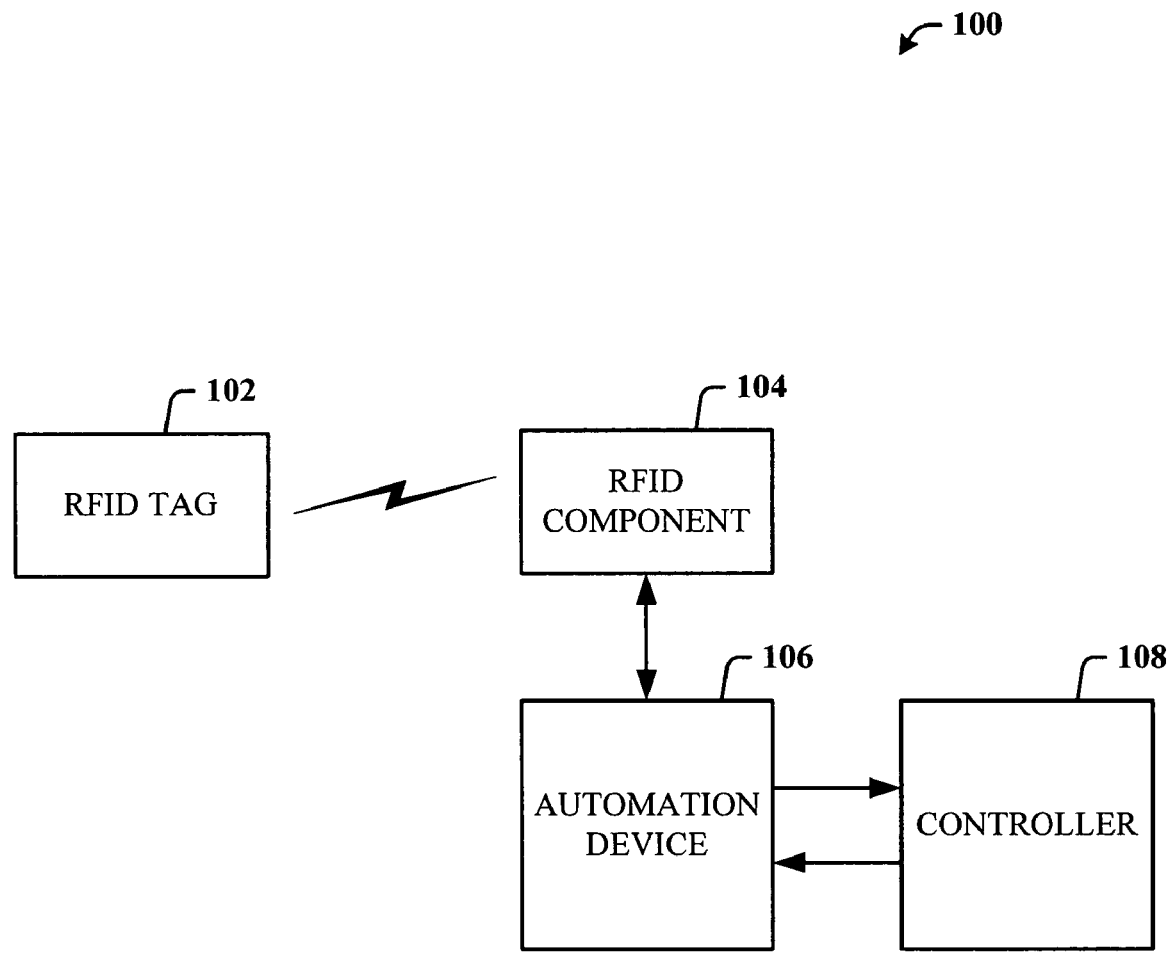
FIG. 1 illustrates a block diagram of an exemplary system that facilitates utilizing RFID tag data with an automation device.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Now turning to the figures, FIG. 1 illustrates a system 100 that facilitates utilizing radio frequency identification (RFID) tag data with an automation device. An RFID component 104 can transfer data from an RFID tag 102 via wireless communication, wherein the RFID tag 102 can include data that can be utilized by an automation device 106. It is to be appreciated and understood that the RFID tag 102 can be a passive RFID tag, and in particular a passive UHF tag. The RFID component 104 can be, but is not limited to, various components that read, write, receive, and/or store electronic product data, such as, readers, writers and/or servers, and can be a handheld device or a fixed-mount device depending on the particular application. The RFID tag 102 can be utilized to store extended data and/or user defined data (also referred to as RFID tag data). This extended data and/or user defined data can be utilized to identify mechanisms and/or operations to be applied by the automation device 106. It is to be appreciated that the automation device 106 can be, but is not limited to, a roller, a station, a welder, a scanner, a belt conveyor, a pump, a press, a fan, etc., or any other suitable device utilized in automation systems. In other words, the extended data and/or user defined data included with the RFID tag 102 can identify a mechanism and/or operation that is to be implemented by the automation device 106. Furthermore, the automation device 106 is controlled by a controller 108. It is to be appreciated that the controller 108 can contain software components and hardware components having inputs and/or outputs that can be utilized in connection with automating an industrial manufacturing device/process.

In one example, the RFID tag 102 can be on an object such that the tag can be programmed with user defined data that corresponds to manufacturing and/or processing of the object. It is to be appreciated that the RFID tag data can be utilized for at least a portion of the manufacturing process and/or operation. Thus, the RFID tag data can be employed through a complete set of stations, a portion of the stations, a portion of operations, etc. In particular, the RFID tag 102 can include data that relates to an operation and/or mechanism to be implemented by the automation device 106 controlled by at least one controller 108. Upon completion of the operation and/or mechanism, the RFID tag data can be: 1) reused by automation devices, operations, mechanisms, stations, controllers, etc.; and/or 2) re-written with disparate extended data and/or user defined data that corresponds to a disparate operation and/or mechanism to be employed.

For example, an RFID tag 102 can be associated with a particular widget, wherein the RFID tag 102 includes extended data that identifies a specific operation and/or mechanism to be performed on the widget by the automation device. The RFID tag data can define a sequence of welding for the widget at two distinct welding stations, wherein the automation device 106 is a welder. The RFID tag data can identify an operation and/or mechanism for the welder in the first station and the second station or the RFID tag data can identify an operation and/or mechanism for the first station and be re-written by the RFID component 104 to update the RFID tag data for the second station. In another example, the widget can be on a conveyor belt system, wherein the automation device 106 can direct the transfer of such widget based at least in part upon the RFID tag 102 and extended data and/or user defined data. In other words, the RFID tag 102 and extended data can be utilized to facilitate transport and/or manipulation of an object.

Figure 2:
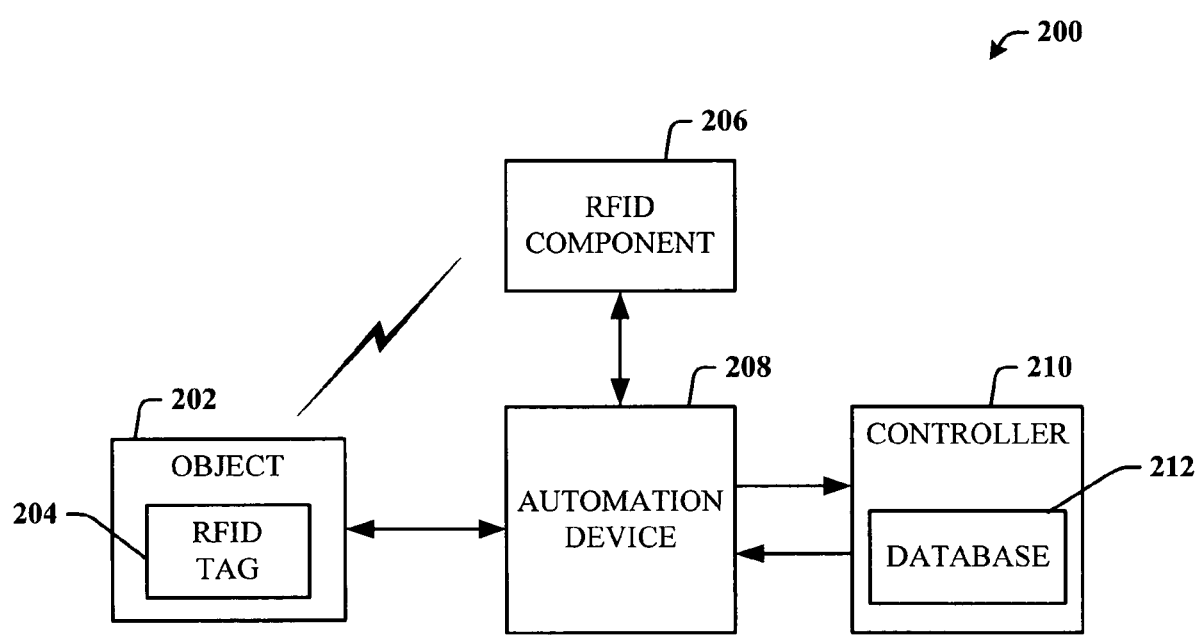
FIG. 2 illustrates a block diagram of an exemplary system that facilitates manipulating an object via an automation device controlled by a controller with an internal database based at least in part upon RFID tag data.

FIG. 2 illustrates a system 200 that facilitates manipulating an object via an automation device controlled by a controller with an internal database based at least in part upon RFID tag data. An object 202 can include an RFID tag 204 that can interact with an RFID component 206 via wireless communication, wherein RFID tag data can identify an operation and/or mechanism to be implemented by an automation device 208. It is to be appreciated and understood that the RFID tag 204 can be a passive RFID tag, and in particular a passive UHF tag. The object 202 can be any suitable article associated with an automation system and/or process, wherein the object can be manipulated by the automation device 208. For instance, the object 202 can be a box, a pallet, a good, a crate, an article of manufacture, etc. Moreover, the object 202 can include the RFID tag 204 by utilizing adhesive and/or any suitable attachment to the object 202.

The automation device 208 can invoke an operation and/or mechanism on the object 202 based at least in part upon the RFID tag data (e.g., extended data, user defined data, identification data, . . . ), wherein the automation device 208 is controlled by a controller 210. It is to be appreciated that the controller 210 can include software and/or hardware components, wherein inputs and/or outputs can be utilized in order to automate an industrial device and/or process. Furthermore, the controller 210 can include an internal database 212 that facilitates storing and/or accessing data to achieve efficiency and speed. The internal database 212 can include information about the object 202 such as, but not limited to, object history, desired operations, intended customer, authorized operator, etc. With the controller 210 having the internal database 212, standardization and functionality can be enabled in the manufacturing process and/or automation system.

The internal database 212 can utilize common database technology for representing, configuring, editing, entering, and communicating the data contained therein. It is to be appreciated and understood that the internal database 212 can include object oriented methods for structuring data and methods that can be operated on such data. By creating the association of data record types to each other and to functions or business rules that could be programmed on the controller 210, the controller 210 and associated automation device 208 can accomplish a plurality of jobs beyond conventional system program logic controller (PLC) based automation devices.

In addition, utilizing the internal database 212 within the controller 210, the control programming can take advantage of direct access to the stored information for driving decisions, operations, mechanisms, manipulations, and controlling devices. By providing an on-board database such as the database 212, the time and/or number of steps required to execute the desired automation functions is greatly reduced. Local automation programming can also advantageously utilize inherent information manipulation capabilities of such system 200 to directly access the data in a form and format more consistent with business data access (e.g., including structured and/or object oriented data representation and addressing).

Figure 3:
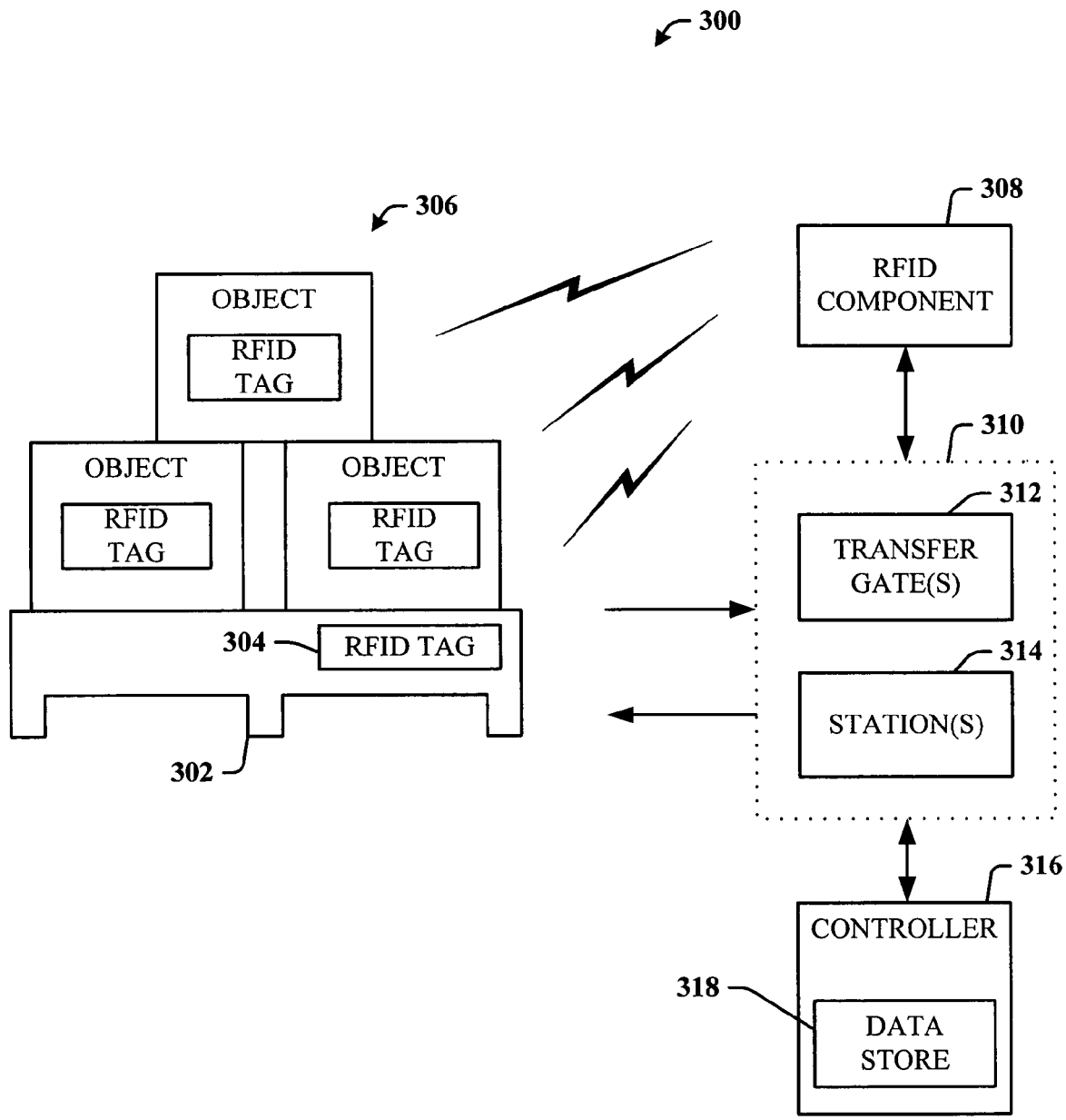
FIG. 3 illustrates a block diagram of an exemplary system that facilitates controlling an object within a manufacturing application utilizing RFID tag data.

FIG. 3 illustrates a system 300 that facilitates controlling an object within a manufacturing application utilizing RFID tag data. A pallet 302 can be associated with an RFID tag 304, wherein various operations and/or mechanism can be related thereto, and such operations and/or mechanisms can be implemented by various automation devices (not shown). Moreover, the pallet 302 can include various objects with respective RFID tags 306, wherein each RFID tag can contain RFID tag data that relates to each object, and/or a portion of the objects. The RFID tag 304 can transfer RFID tag data, extended data, and/or user defined data via wireless communication to an RFID component 308, wherein the RFID component 308 can cause various components 310 within automation to utilize such data. It is to be appreciated and understood that the RFID tags 304 and 306 can be passive RFID tags, and in particular, passive UHF tags. The RFID tag data (e.g., extended data, user defined data, etc.) can be utilized by at least one transfer gate 312 and/or at least one station 314, wherein the transfer gate 312 can be considered an automation device and the station 314 can include at least one automation device. Furthermore, the various components 310 that can utilize the extended RFID tag data to influence the pallet 302 and/or various objects with respective RFID tags 306 can be controlled by a controller 316 that includes an internal data store 318 that stores RFID related information (e.g., object history, desired operations, intended customer, authorized operator, etc.).

For instance, the pallet 302 can be received at a docking location, wherein the RFID tag 304 can identify the pallet 302 and extended data and/or user defined data on the RFID tag 304 that relates to various operations (e.g., manipulations, moving, welding, pressing, fanning, heating, cooling, etc.) can be applied. Moreover, the stations 314 and/or transfer gates 312 can implement various operation(s) on the pallet 302, the various objects with respective RFID tags 306, and/or a portion of the various objects with respective RFID tags 306. In one example, a crane (e.g., an automation device), can re-locate an object based at least in part upon the extended data contained within the RFID tag associated therewith.

It is to be appreciated that the RFID tag data (e.g., extended data, user defined data, identification data, etc.) can include direct routing and/or processing information for the objects 306 and/or a portion of the objects 306. Thus, a reference back to an information store external to the objects 306 is not necessary. Moreover, as stated above, an automation device (not shown) can write to the extended space on the RFID tags to efficiently pass such information from one step in a process to the next.

The extended information can be related to routing information for the object as it moves through a set of material transfer gates 312. Moreover the information can be detailed process parameters for driving process automation control at multiple stations 314 in a manufacturing application. In addition, it is to be appreciated and understood that the source of the information can be from the object itself in the form of a sensor (not shown) input into the RFID extended data space.

The affect on the automation systems and/or devices can be direct and/or indirect. In a direct effect scenario, the RFID tag data (e.g., bits and/or numbers in the extended information) can be directly utilized as the decision that drives control of outputs. For example, the bits can directly indicate the state of a digital output. If a bit in the extended data is true, then the output can be energized; and if the bit is false, it can be de-energized. In another example, the numbers and/or bits can directly command the value of an analog output or set point to a control loop.

In an indirect scenario, the bits and/or numbers in the extended data can select a decision or outcome that can drive control of outputs. For instance, one bit can indicate a set of desired outcomes for a single station 314 of automation such as diverting a package from a conveyor. Such actions can include the activations of several pieces of automation to accomplish, but can be triggered as a single outcome based on a single bit. In another example, the numbers and/or bits can indirectly be utilized to select an outcome from a pre-programmed set of responses in a particular piece of automation. For instance, this can be a station 314 that can do one of three manipulations with a tagged item. The automation can require a number larger than what can be represented by a single bit to indicate the selection of an outcome or operation that is to be performed by the claimed subject matter. In other words, the multiple bits in the RFID tag data can be utilized to select one of the three manipulations by implementing the multiple bits therein.

Furthermore, the controller 316 can utilize the internal data store 318 to store and/or access information carried in the RFID tag associated with the objects 306. The data store 318 can store various data related to the system 300, such as, but not limited to object history, desired operations, desired mechanisms, location information, intended customer, authorized operator, etc. The data store 318 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 318 of the subject systems and methods is intended to comprise, without being limited to, these and any other suitable types of memory. In addition, it is to be appreciated that the data store 318 can be a server, a database, a hard drive, and the like.

Figure 4:
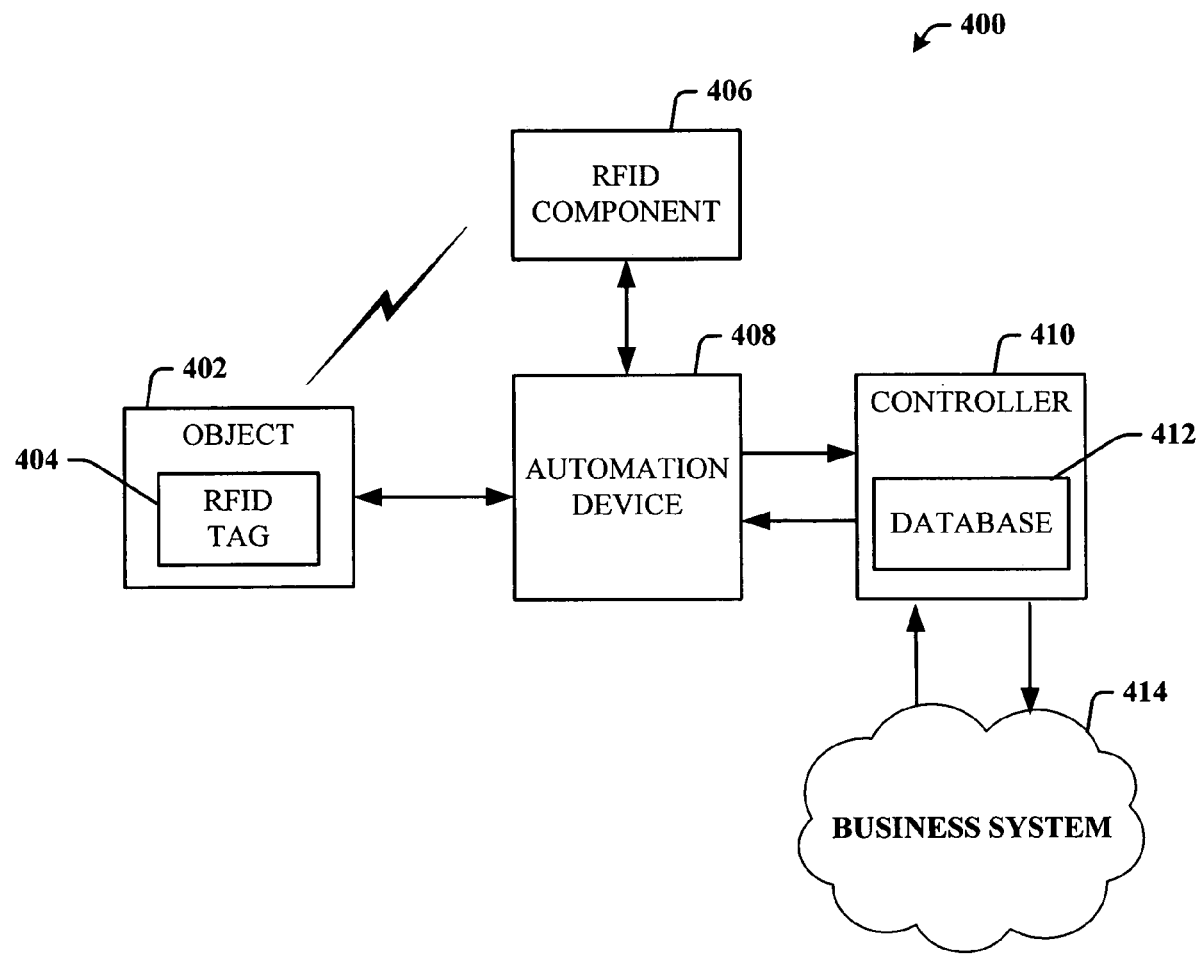
FIG. 4 illustrates a block diagram of an exemplary system that facilitates controlling an automation device with a controller having an internal database by implementing the use of RFID tag data.

FIG. 4 illustrates a system 400 that facilitates controlling an automation device with a controller having an internal database by implementing the use of RFID tag data. An object 402 can be identified by an RFID tag 404, wherein such RFID tag 404 can communicate via wireless communication with an RFID component 406. The RFID tag 404 can be, for instance, a passive UHF tag. The RFID component 406 can receive data included with the RFID tag 404 that can be utilized to identify an operation and/or mechanism to be implemented on the object 402 by an automation device 408. The automation device 408 can be controlled by a controller 410 that contains an internal database 412. It is to be appreciated that the object 402, the RFID tag 404, the RFID component 406, the automation device 408, the controller 410, and the database 412 can be substantially similar to the components described in previous figures.

The controller 410 can further utilize any suitable communications (e.g., internal and/or external) from a business system 414. The business system 414 can further include various other databases and/or methods consistent to inter-data communications. For example, such techniques can include the utilization of extensible markup language (XML) for formatting requests and/or transactions associated with the business system 414. In addition, standard definitions can be included such as business to manufacturing markup language (B2MML) to define information that can be passed to and from such a manufacturing database. It is to be appreciated that the transactions can carry the desired manufacturing operations and/or orders as well as response and status from the automation controller as to the state of the object, equipment, automation device, requested operation, etc.

Figure 5:
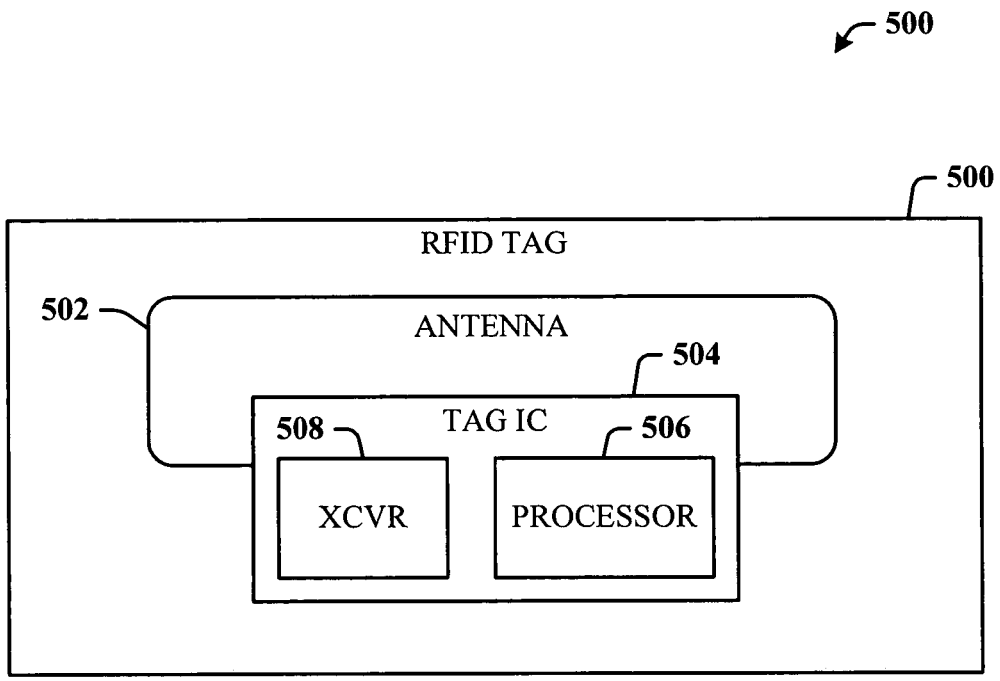
FIG. 5 illustrates an RFID tag in accordance with the claimed subject matter.

FIG. 5 illustrates an RFID tag 500 in accordance with the claimed subject matter. It is to be appreciated and understood that the tag 500 can be a passive RFID tag, and in particular a passive UHF tag. The tag 500 can include a single antenna 502 (or multiple antennas) (denoted ANTENNA) that facilitates communicating signals and data with an RFID reader (or reader/writer) (not shown). The tag 500 also includes a tag IC 504 that provides onboard processing of the data and signals. In support thereof, the tag IC 504 further includes a processor 506 (e.g., a digital signal processor-DSP) that facilitates data and signal processing and storage, and a transceiver 508 that interfaces to the antenna 502 for communications of the data and signals. It is to be appreciated that the tag 500 can be a passive tag (e.g., no internal power supply) and/or an active tag, such that a power source (not shown) (e.g., a coin cell, capacitor) is provided.

Figure 6:
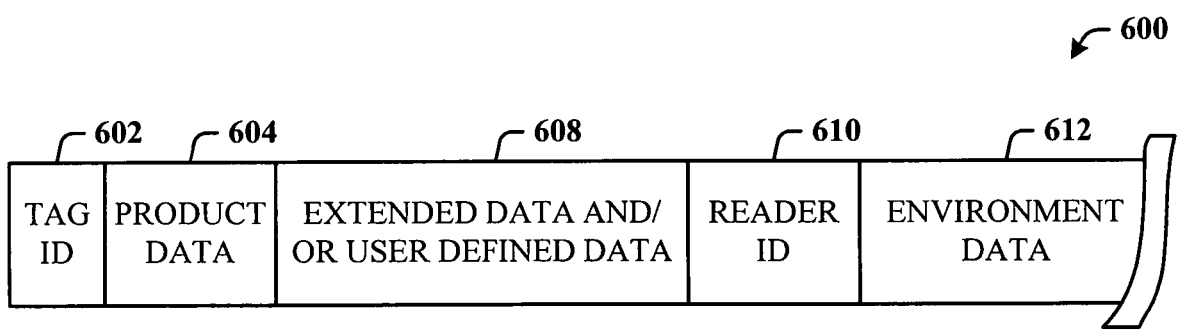
FIG. 6 illustrates an exemplary RFID data packet that includes extended data which can be utilized by an automation device controlled by a controller with an internal database.
Figure 7:
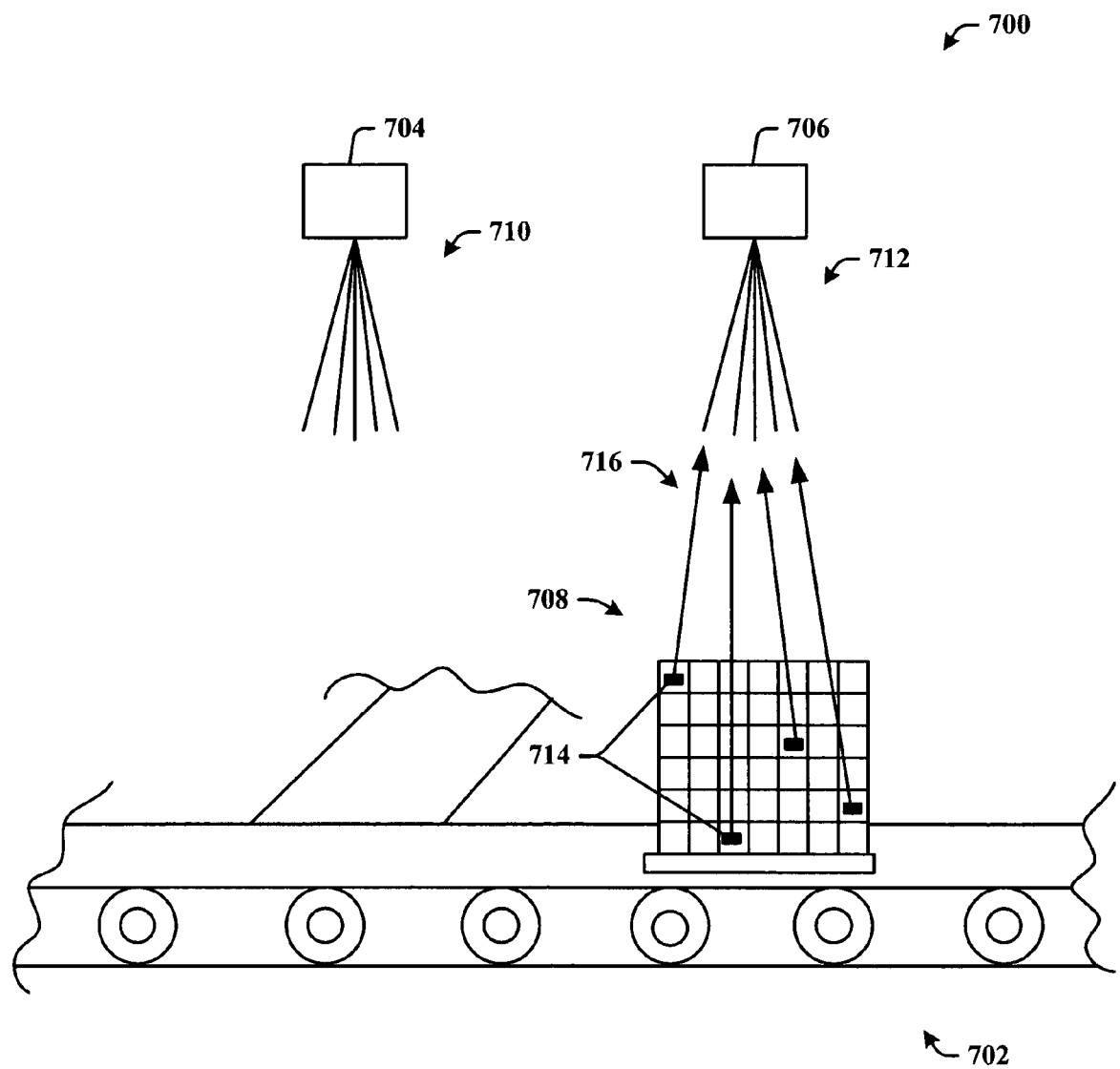
FIG. 7 illustrates an application of an RFID system in accordance with at least one aspect of the claimed subject matter.

FIG. 6 illustrates an exemplary RFID data packet 600 that includes extended data which can be utilized by an automation device controlled by a controller with an internal database. The RFID data packet 600 can be related to a passive RFID tag, and in particular a passive UHF tag. The packet 600 can include a tag ID 602 that uniquely identifies the tag; however, this is not a requirement. Product data 604 is included that describes the product to which the RFID tag is attached or associated. The packet 600 also includes extended data and/or user defined data 608. The extended data and/or user defined data 608 can be utilized to encode information that can be directly and/or indirectly utilized by automation devices that operate on the product and/or object. For example, the extended data and/or user defined data 608 can be routing information for an object and/or detailed process parameters for driving process automation control. Reader ID data 610 can be received from the reader from which the generated frequency can be known. Environmental data 612 can also be communicated, since the tag IC can interface to one or more environmental sensors (e.g., temperature, pressure, humidity, shock, vibration, . . . ). Other data can also be communicated via the packet 600, according to the particular application FIG. 7 illustrates an application of an RFID system 700 in accordance with at least one aspect of the claimed subject matter. While FIG. 7 illustrates products being moved by a conveyor belt system 702, it will be appreciated that the claimed subject matter works equally well in other applications such as a forklifts, trucks, line, manual movement of goods, etc. A plurality of RFID R/W devices (a first reader 704, and a second reader 706) are employed to detect the presence of a plurality of RFID tags. While the RFID devices (704 and 706) are shown as overhead devices, it should be understood that the devices can be located anywhere, provided the range of coverage is appropriate for the particular purpose. For example, the devices (704 and 706) can be underneath, on the side and or in various locations throughout the environment. Each of the RFID R/W devices (704 and 706) transmits respective signals (710 and 712) that can be constant, intermittent, or periodically transmitted, such as when activated by a sensor device.

As a pallet of products 708 is moved (e.g., by a conveyor belt system 702 or other suitable means), the products move within the read range of the second RFID R/W reader 706. RFID tags associated with respective products, a few of which are illustrated at 714, are activated by the corresponding emitted signal 712, and respond via respective return signals 716 communicated to the second RFID R/W device 706. It is to be appreciated and understood that the RFID tags can be passive RFID tags, and in particular passive UHF tags. As the conveyor belt system 702 and associated pallet of products 708 move though the environment, the products enter the range of the first RFID R/W device 704, and the associated return signals will be transmitted in a similar manner. As the pallet of products 708 is moving, the RFID tags are constantly activated (for passive devices) and providing information concerning at least one parameter associated with the RFID R/W device (e.g., signal strength, origin, ...) and/or operating conditions.

Figure 8:
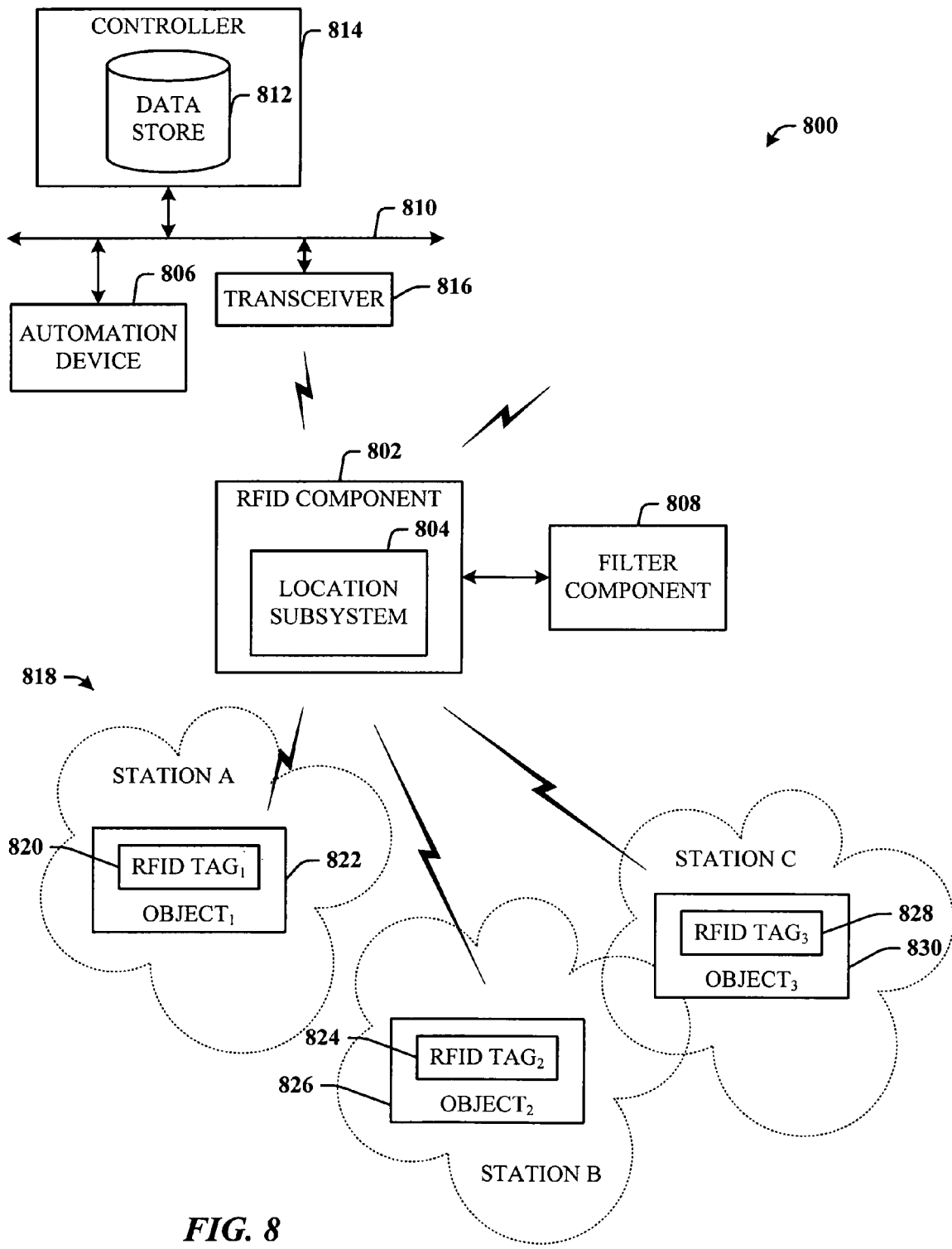
FIG. 8 illustrates a block diagram of an RFID system having a plurality of stations that interact with a plurality of objects having respective RFID tags.

FIG. 8 illustrates a block diagram of an RFID system 800 having a plurality of stations that interact with a plurality of objects having respective RFID tags. It is to be appreciated and understood that the RFID tags can be passive RFID tags, and in particular passive UHF tags. When an RFID component 802 (e.g., an RFID reader) reads RFID tags, a read signal is broadcast from the RFID component 802 that energizes and/or causes to be received RFID tag data from all tags in a given range thereof. Thus, the RFID component 802 can receive data from a large number of tags for which data is not desired. Not only does this impose additional processing requirements on the RFID component 802, but it can also negatively impact network bandwidth between the RFID component 802 and a remote system. Thus, a filter component 808 can interface the RFID component 802 and process the RFID tag data to filter out tag signals that are unwanted. Note that the filter component 808 can also be made internal to the RFID component 802.

The system can also include a network 810 on which is disposed an automation device 806 and/or a plurality of automation devices that can utilize the RFID tag data in order to identify an operation and/or mechanism to be performed upon an object. Moreover, a controller 814 (e.g., a PLC) can also be disposed on the network 810 in control of an automated process such as moving product down an assembly line. The controller 814 can include an internal data store 812, where such data store can store any data suitable to be utilized in conjunction with the implementation of an RFID tag such as, but not limited to, object history, desired operations, intended customer, authorized operator, etc. A transceiver 816 provides wireless network communications between the network 810 and the RFID component 802 such that location data and tag data can be communicated to the data store 812 and/or the controller 814.

Illustrated are objects 818 (denoted $OBJECT_1$, $OBJECT_2$, and $OBJECT_3$) and associated RFID tags (denoted RFID $TAG_1$, RFID $TAG_2$, and RFID $TAG_3$) in respective stations (STATION A, STATION B, AND STATION C). The user desires to read a tag 820 of a first object 822 in station A, yet receives in addition thereto data from a second tag 824 of a second object 826 in station B and a third tag 828 of a third object 830 in a station C. The location system 806 can facilitate the determination of location data of the reader 802 such that in this example, the user is determined to be closer to station A.

It can already be known from prior tag scans and/or user input information, for example, that the first object 822 is associated with station A, the second object 826 is associated with station B, and the third object 830 is associated with station C. Accordingly, any other tag data received by the reader 802 indicating that the tag (824 and 828) is associated with an object that is not in station A can be filtered without further processing. Similarly, as the user moves the mobile reader that contains the RFID component 802 closer to station B, the tag data that is received from object tags in station A and station C can be filtered out from further consideration.

Figure 9:
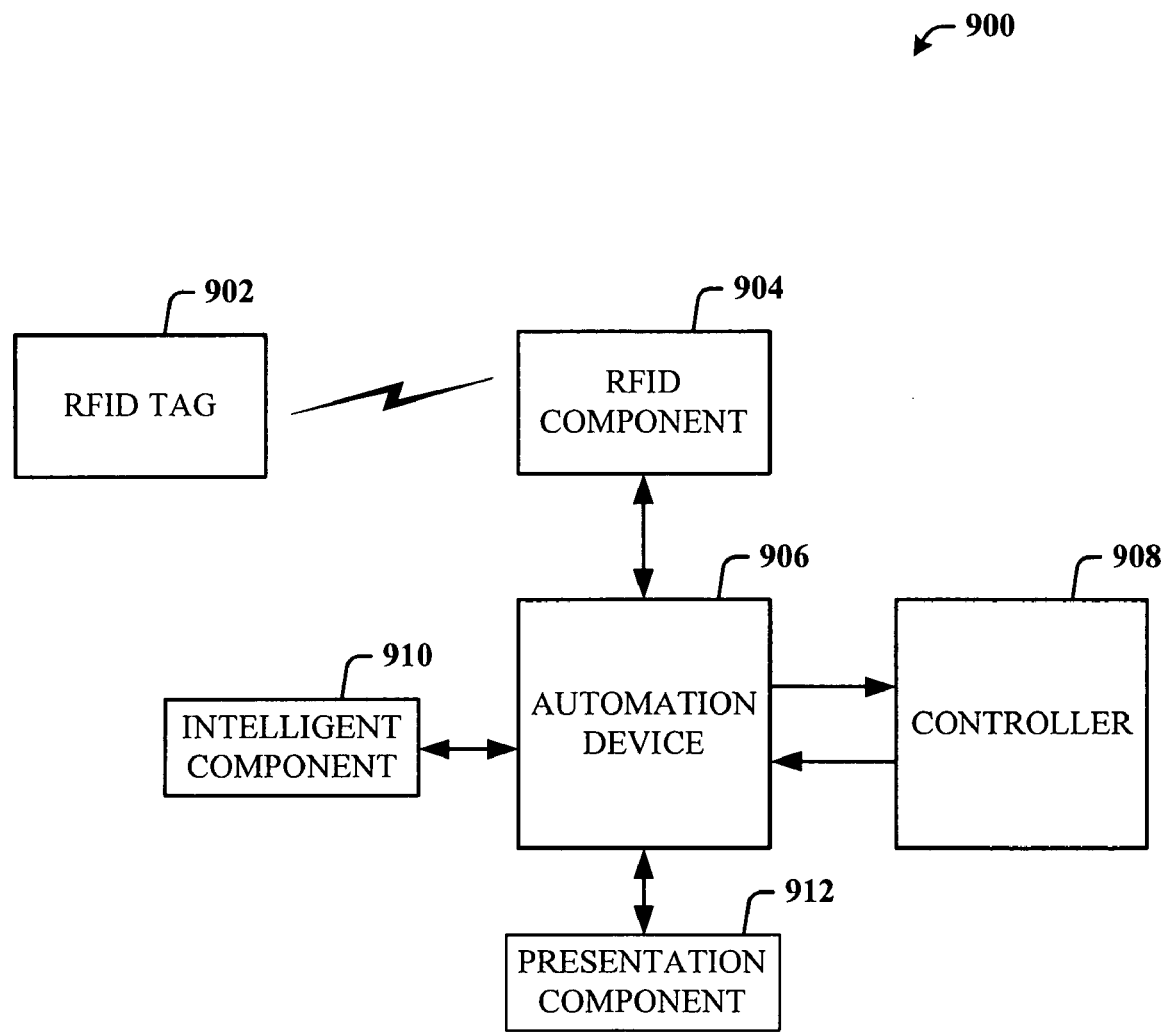
FIG. 9 illustrates a block diagram of an exemplary system that facilitates utilizing RFID tag data with an automation device.

FIG. 9 illustrates a system 900 that facilitates utilizing RFID tag data with an automation device. The system 900 can employ intelligence to facilitate utilizing RFID extended data to identify an operation implemented by an automation device. The system 900 can include an RFID tag 902, an RFID component 904, an automation device 906, and a controller 908 that can all be substantially similar to respective components, devices, controllers, and tags described in previous figures. The system 900 further includes an intelligent component 910. The intelligent component 910 can be utilized by the automation device 906 to facilitate implementation of the RFID tag data (e.g., extended data, user defined data, ...). For example, the intelligent component 910 can infer the operation and/or mechanisms to be instantiated upon an object associated with the RFID tag 902, filtering signals, location, etc.

It is to be understood that the intelligent component 910 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines ...) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

A presentation component 912 can provide various types of user interfaces to facilitate interaction between a user and any component associated with the system 900. As depicted, the presentation component 912 is a separate entity that can be utilized with the automation device 906. However, it is to be appreciated that the presentation component 912 and/or similar view components can be incorporated into the automation device 906 and/or a stand-alone unit. The presentation component 912 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such vertical and/or horizontal scroll bars for navigation and toolbar buttons to determine whether a region will be viewable can be employed. For example, the user can interact with one or more of the components coupled to the automation device 906.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 10:
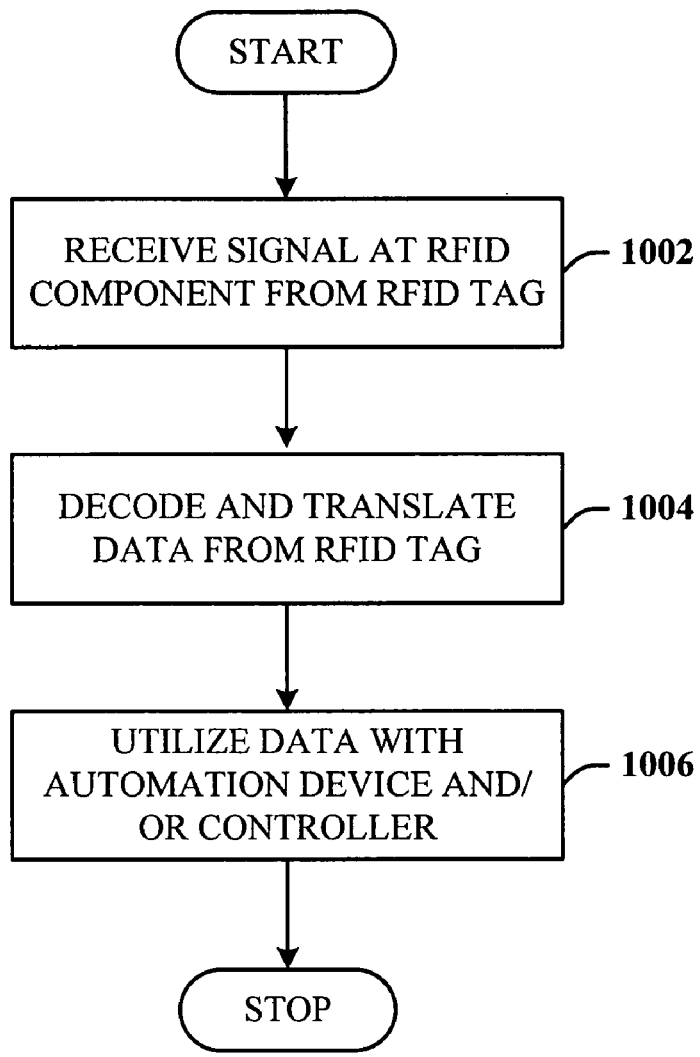
FIG. 10 illustrates a methodology for utilizing RFID tag data with an automation device.
Figure 11:
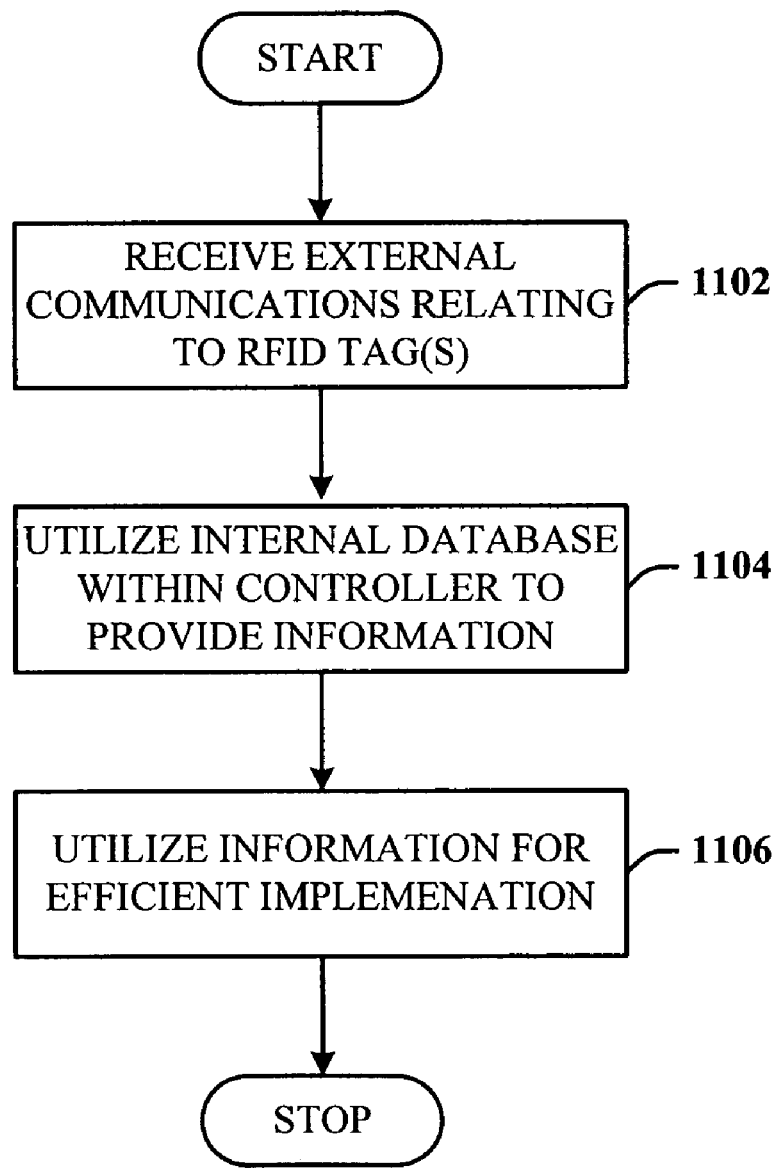
FIG. 11 illustrates a methodology that facilitates optimizing the efficiency of an automation device implementing RFID tag data.
Figure 12:
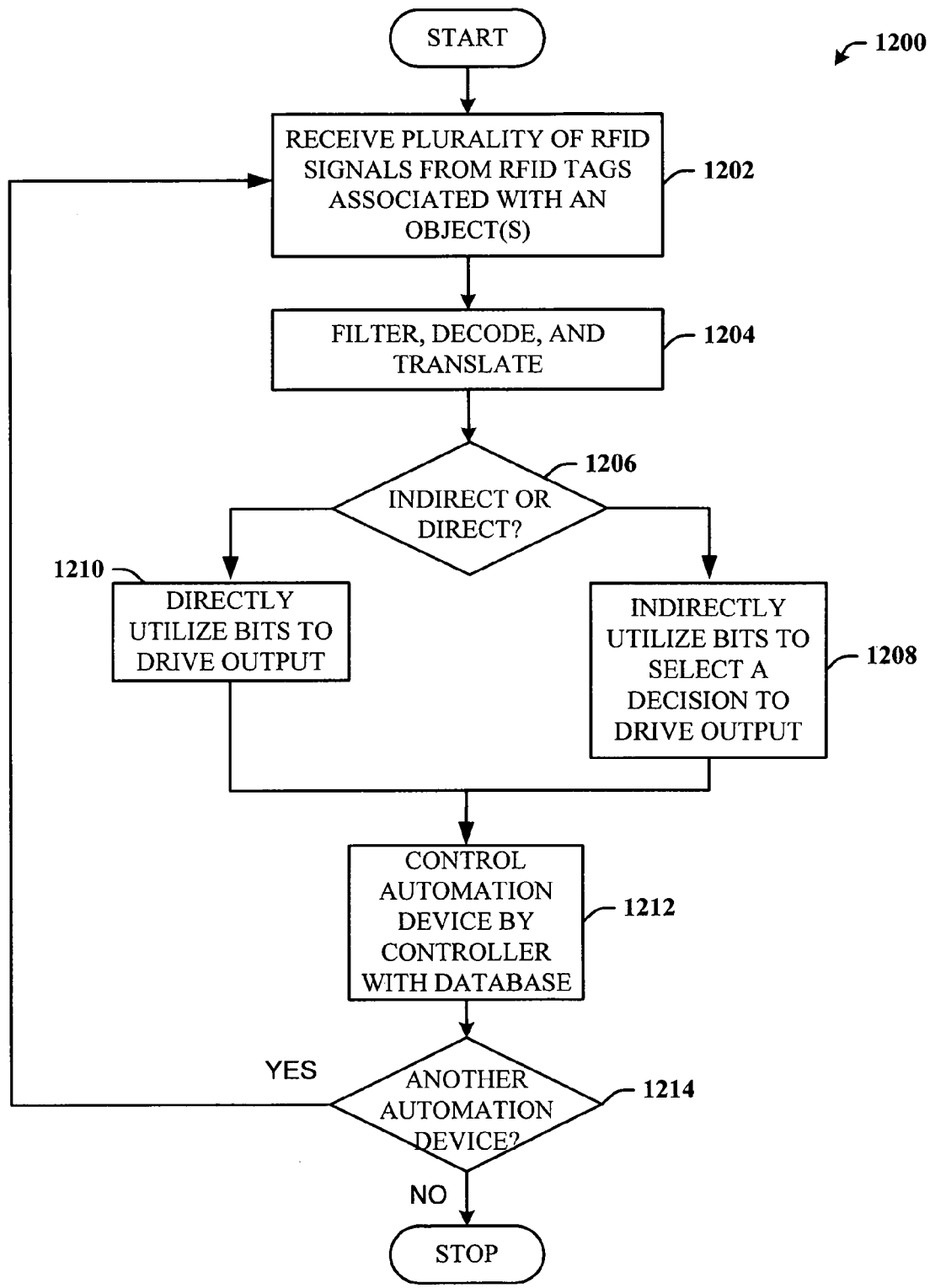
FIG. 12 illustrates a methodology for utilizing RFID tags in association with an automation device and a controller.

FIGS. 10-12 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

FIG. 10 illustrates a methodology 1000 for utilizing RFID tag data with an automation device. At reference numeral 1002, a signal can be received at an RFID component from an RFID tag. The RFID component can be, but is not limited to, various components that read, write, receive, and/or store electronic product data, such as, readers, writers and/or servers, and can be a handheld device or a fixed-mount device depending on the particular application. It is to be appreciated and understood that the RFID tag can be a passive RFID tag, and in particular a passive UHF tag. The RFID tag can be utilized to store extended data and/or user defined data (also referred to as RFID tag data). At reference numeral 1004, the data from the RFID tag can be decoded and/or translated. At reference numeral 1006, the data (e.g., extended data and/or user defined data) can be utilized to identify mechanisms and/or operations to be applied by the automation device and/or a controller that controls an automation device. It is to be appreciated that the automation device can be, but is not limited to, a roller, a station, a welder, a scanner, a belt conveyor, a pump, a press, a fan, etc., or any other suitable device utilized in automation systems.

FIG. 11 illustrates a methodology 1100 that facilitates optimizing the efficiency of an automation device implementing RFID tag data. At reference numeral 1102, an external communications can be received relating to an RFID tag and/or a plurality of RFID tags. The RFID tag can be associated with at least one object and/or portion of objects that are related to an automation system and/or manufacturing process. It is to be appreciated and understood that the RFID tag can be a passive RFID tag, and in particular a passive UHF tag. At reference numeral 1104, an internal database and/or data store within a controller can provide information related to the RFID tag and/or associated object. The controller can include hardware and/or software that utilize inputs and/or outputs, wherein the controller can be programmed to deliver automation. The internal database can include information about the object such as, but not limited to, object history, desired operations, intended customer, authorized operator, etc. With the controller utilizing the internal database, standardization and functionality can be advantageous in the manufacturing process and/or automation system. At reference numeral 1106, information from the internal database can be utilized with RFID technology and automation for efficient implementation.

For instance, the control programming can take advantage of direct access to the stored information for driving decisions, operations, mechanisms, manipulations, and controlling devices. By providing an on-board database such as the database, the time and/or number of steps required to execute the desired automation functions is greatly reduced. Local automation programming can also advantageously utilize inherent information manipulation capabilities of such system to directly access the data in a form and format more consistent with business data access.

FIG. 12 illustrates a methodology 1200 for utilizing RFID tags in association with an automation device and a controller. At reference numeral 1202, a plurality of RFID signals related to RFID tags can be received, wherein the RFID tags can be associated with an object, a plurality of objects, and/or a portion of objects. At reference numeral 1204, any suitable filter, decode, and/or translate technique(s) can be implemented on the RFID signals received. At reference numeral 1206, a determination can be made whether the extended data within the RFID tag is to directly or indirectly influence an automation system, automation device, station, process, etc. If the influence is direct, the method continues at reference numeral 1210, where the bits and/or numbers within the extended data and/or user defined data drives control of an output. If the influence is indirect, the method continues at reference numeral 1208, where the bits and/or numbers associated with the extended data and/or user defined data can select a decision to drive control of an output.

At reference numeral 1212, the automation device and/or automation can be controlled by a controller that contains an internal database and/or data store. The internal database can include information about the object such as, but not limited to, object history, desired operations, intended customer, authorized operator, etc. With a controller utilizing an internal database and/or data store, the efficiency of incorporating RFID tag data can be increased dramatically. At reference numeral 1214, a determination can be made whether there is another automation device that is to utilize the extended data and/or user defined data associated with the RFID tag to implement an operation and/or mechanism on an object. If there is another automation device, the process can continue at reference numeral 1202.

Figure 13:
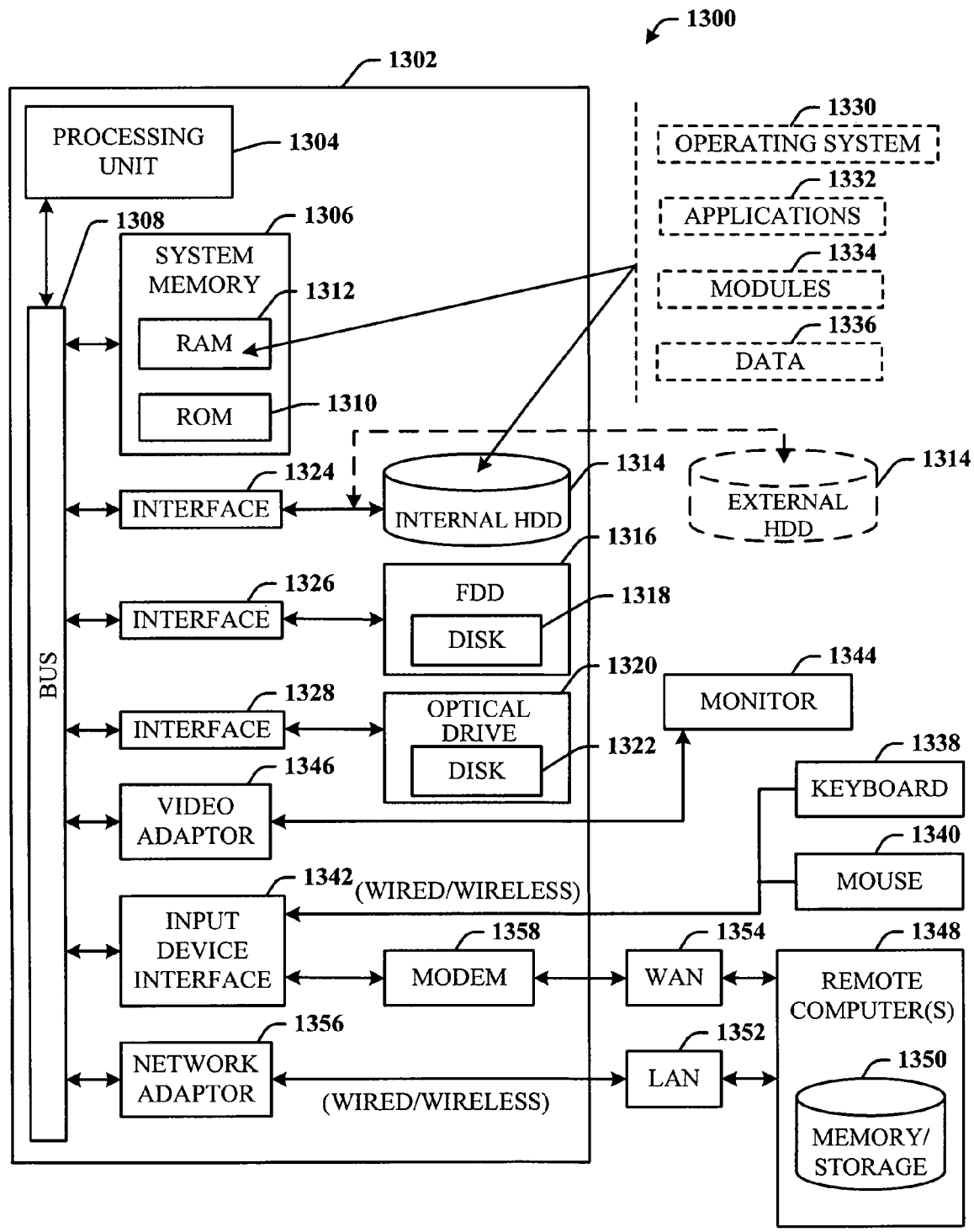
FIG. 13 illustrates a block diagram of a computer operable to execute the disclosed architecture.
Figure 14:
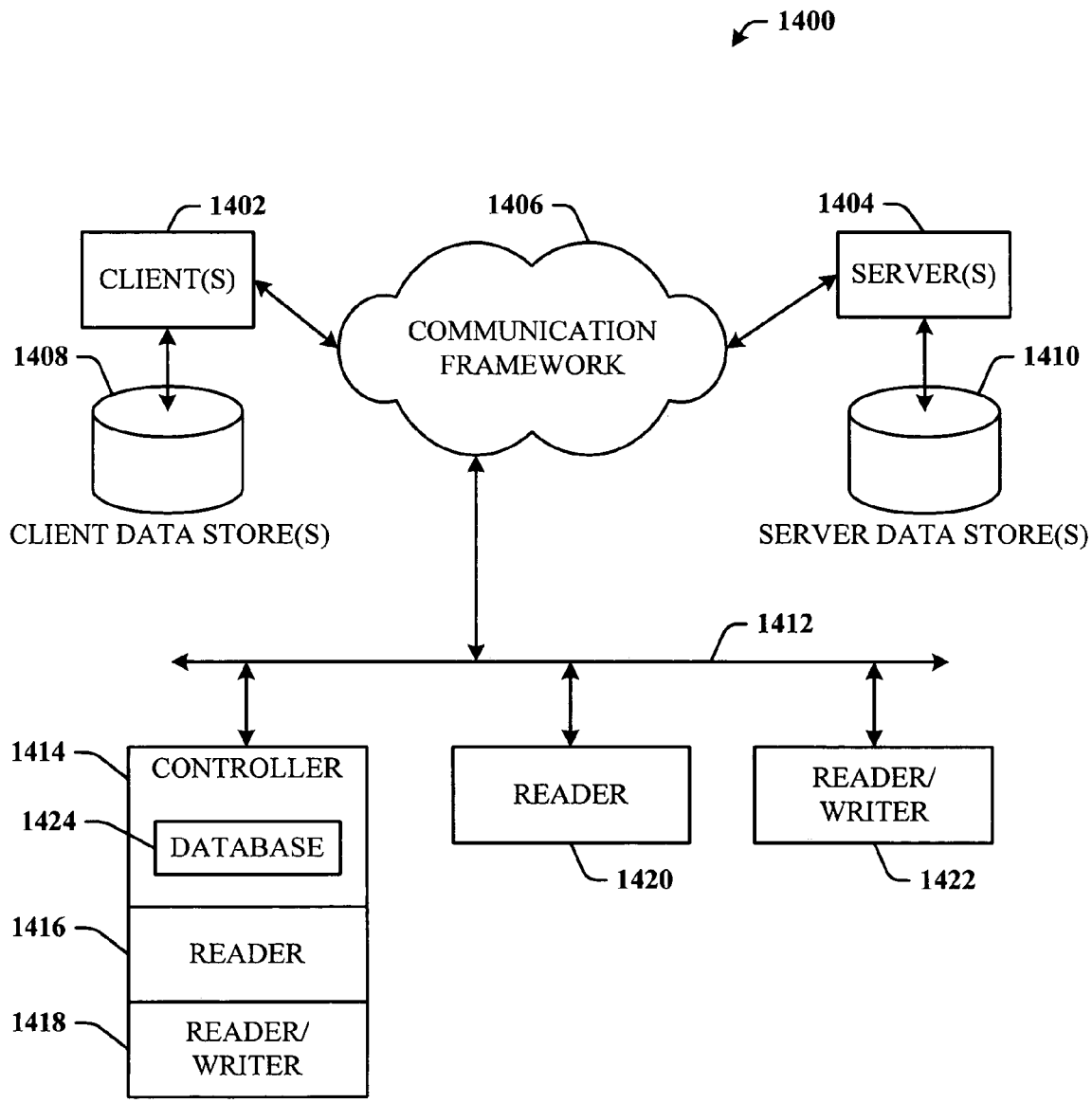
FIG. 14 illustrates a schematic block diagram of an exemplary computing environment in accordance with the claimed subject matter.

In order to provide additional context for implementing various aspects of the claimed subject matter, FIGS. 13-14 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 13, the exemplary environment 1300 for implementing various aspects of the invention includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 may also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316, and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject invention.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1312, including an operating system 1330, one or more application programs 1332, other program modules 1334, and program data 1336. All or portions of the operating system, applications, modules, and/or data can also be cached in the RAM 1312. It is appreciated that the invention can be implemented with various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 may operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device, or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1302 is connected to the local network 1352 through a wired and/or wireless communication network interface or adapter 1356. The adaptor 1356 may facilitate wired or wireless communication to the LAN 1352, which may also include a wireless access point disposed thereon for communicating with the wireless adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Referring now to FIG. 14, there is illustrated a schematic block diagram of an exemplary computing environment 1400 in accordance with the subject invention. The system 1400 includes one or more client(s) 1402. The client(s) 1402 can be hardware and/or software (e.g., threads, processes, computing devices). The client(s) 1402 can house cookie(s) and/or associated contextual information by employing the invention, for example.

The system 1400 also includes one or more server(s) 1404. The server(s) 1404 can also be hardware and/or software (e.g., threads, processes, computing devices). The servers 1404 can house threads to perform transformations by employing the invention, for example. One possible communication between a client 1402 and a server 1404 can be in the form of a data packet adapted to be transmitted between two or more computer processes. The data packet may include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

The framework 1406 can also include a subnetwork 1412, for example, that can be implemented as in an assembly line environment. The subnetwork 1412 can have disposed thereon as nodes, a controller 1414 (e.g., a PLC) that controls a reader module 1416 and a reader/writer module 1418 both of which can read RFID tags, and the latter of which can write data to the RFID tags. The controller 1414 can include an internal database 1424 to store RFID tag data information as described above. The controller 1414, reader module 1416 and reader/writer module 1418 can be provided in a rack configuration at selected locations. Alternatively or in combination therewith, the subnetwork 1412 can also include a second reader module 1420 as a wired or wireless node (or client) that is positioned (fixed or mobile) to read RFD tags, as needed. Similarly, the subnetwork 1412 can also support a reader/writer module 1422 as a wired and/or wireless client node for reading and writing data and signals to RIFD tags that come within a coverage area.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates utilizing a radio frequency identification (RFID) tag associated with an object, comprising:
    a filter component that processes data received from a plurality of RFID tags associated with a plurality of stations in response to a read broadcast and passes data from RFID tags that are associated with one of the plurality of stations, the one of the plurality of stations is selected based in part on a location of a mobile reader that transmits the read broadcast and a location of the one of the plurality of stations, wherein the mobile reader includes a location component that determines the location of the mobile reader;
    an RFID component that identifies extended data from the data passed by the filter component, the extended data identifies an operation to be performed on the object;
    an automation device that manipulates the object based at least in part upon the extended data and the identified operation, wherein a decision to drive control of an output is selected indirectly by least one of bits or numbers associated with the extended data; and
    an internal database local to a controller that is employed to store additional data associated with a plurality of objects, the controller identifies the additional data associated with the object based in part on the extended data and controls manipulation of the object by the automation device based in part on the additional data.

2. The system of claim 1, the RFID component includes at least one of the mobile reader or an RFID writer.

3. The system of claim 1, the automation device is at least one of a roller, a station, a welder, a scanner, a belt conveyor, a pump, a press, a transfer gate, a crane, or a fan.

4. The system of claim 1, the plurality of RFID tags are passive ultra high frequency (UHF) RFID tags.

5. The system of claim 1, wherein the additional data associated with the object includes at least one of an object history, location information, an intended customer, or an authorized operator.

6. The system of claim 1, wherein the automation device manipulates the object based on at least one of an indirect effect or a direct effect of an analysis of the received extended data.

7. The system of claim 6, the direct effect is utilizing a bit within the extended data as a decision that drives control of the output.

8. The system of claim 6, the indirect effect is utilizing a bit within the extended data as a selector of a decision that drives the control of the output.

9. The system of claim 1, further comprising a transceiver that provides wireless network communications between the RFID component and a network that connects to the internal database, the transceiver facilitates communication of at least one of location data or tag data between the RFID component and at least one of the internal database or the controller.

10. The system of claim 9, wherein the filter component utilizes the current location to filter out one or more signals from distant RFID tags that are not located within a specified distance of the mobile reader.

11. The system of claim 1, wherein the RFID component re-writes the extended data on completion of the operation.

12. The system of claim 11, the re-written extended data is utilized at a disparate automation device.

13. The system of claim 1, the extended data is routing information for the object moving through a material transfer gate.

14. The system of claim 1, the extended data is a process parameter that drives process automation control at the plurality of stations in a manufacturing application.

15. The system of claim 1, the controller receives external communications from a business system that includes at least one of a disparate operation or an order associated with the object.

16. The system of claim 15, the controller utilizes extensible markup language (XML) for formatting at least one of requests or transactions associated with the business system.

17. The system of claim 1, further comprising an intelligent component that employs at least one of a probabilistic or statistical-based analysis to prognose or infer an action to be automatically performed on the object by the automation device.

18. The system of claim 1, the plurality of RFID tags includes at least one of reader identification or environment data.

19. A computer-implemented method that facilitates utilizing a radio frequency identification (RFID) tag associated with an object, comprising:
    receiving a signal at an RFID component, within a mobile reader, from the RFID tag associated with at least one station;
    identifying, at the mobile reader, a location of the RFID component;
    determining whether to process data from the RFID tag based in part on the location of the RFID component and a location of the at least one station;
    decoding and translating the data from the RFID tag if the determining indicates that the data is to be processed;
    determining if the data within the RFID tag indirectly influences an automation system such that at least one of bits or numbers associated with the data select a decision to drive control of an output of the automation system;
    receiving additional information associated with the object from an internal database within the controller by utilizing at least in part the data from the RFID tag; and
    utilizing the selection, the additional information from the internal database and the data from the RFID tag to control an operation performed by an automation device on the object.

20. The method of claim 19, further comprising, communicating with an external business system by employing the internal database to at least one of receive a disparate operation, receive an order, or deliver status information from the automation system.

21. The method of claim 19, further comprising:
    determining if the data is to directly effect or indirectly effect the output;
    controlling the automation device with the controller that has the internal database based in part on the data and the additional information from the internal database;
    determining if another automation device is to utilize the data; and
    re-writing the data upon completion of the operation.

22. The method of claim 19, further comprising, directly accessing information from the internal database in at least one of a form or format consistent with business data access, the at least one form or format comprising at least one of structured or object oriented data representation and addressing.

23. The method of claim 19, wherein the utilizing includes utilizing the selection, the additional information from the internal database and the data from the RFID tag to control the operation performed by at least one of a roller, a station, a welder, a scanner, a belt conveyor, a pump, a press, or a fan on the object.

24. The method of claim 19, further comprising, receiving one or more process parameters from the RFID tag for driving a process performed by the automation system on the object.

25. The method of claim 20, wherein the communicating includes communication with an external business system by employing the internal database to receive at least one of an object history, location information, an intended customer, or an authorized operator, associated with the object.

26. The method of claim 19, further comprising,
determining a distance between the RFID component and the at least one station based in part on the location of the RFID component.

27. A computer-implemented system that facilitates utilizing a radio frequency identification (RFID) tag associated with an object, comprising:
means for receiving data from a plurality of RFID tags associated with a plurality of stations in response to a read signal broadcast from a mobile reader;
means for determining, within the mobile reader, a location of the means for receiving data;
means for filtering data from a set of RFID tags that are associated with one of the plurality of stations, the one of the plurality of stations is selected based in part on the location of the mobile reader and a location of the one of the plurality of stations;
means for identifying extended data from at least one of the set of RFID tags associated with an object, the extended data identifies an operation to be performed on the object;
means for directly accessing information from an database internal to a controller to determine additional information associated with the object based on the extended data, the additional information includes at least one of object history, location information, intended customer data, or authorized operator data; and
means for controlling the manipulation of the object based at least in part upon the extended data, the additional information and the identified operation.

28. The system of claim 1, wherein the internal database includes object oriented methods for structuring data and methods that can be operated on the data.

* * * * *